(12) United States Patent
Parkes

(10) Patent No.: US 10,689,864 B2
(45) Date of Patent: Jun. 23, 2020

(54) AUTOMATED BRICK LAYING SYSTEM AND METHOD OF USE THEREOF

(71) Applicant: Construction Automation Ltd, Yorkshire (GB)

(72) Inventor: Stuart Parkes, Yorkshire (GB)

(73) Assignee: Construction Automation Ltd. (GB)

( * ) Notice: Subject to any disclaimer, the term of this patent is extended or adjusted under 35 U.S.C. 154(b) by 0 days.

(21) Appl. No.: 16/047,143

(22) Filed: Jul. 27, 2018

(65) Prior Publication Data
US 2019/0032348 A1 Jan. 31, 2019

(30) Foreign Application Priority Data

Jul. 28, 2017 (GB) .................................. 1712164.1

(51) Int. Cl.
*E04G 21/22* (2006.01)
*B25J 5/02* (2006.01)

(52) U.S. Cl.
CPC .................. *E04G 21/22* (2013.01); *B25J 5/02* (2013.01); *G05B 2219/45086* (2013.01)

(58) Field of Classification Search
CPC ... E04G 21/22; G05B 2219/45086; B25J 5/02
USPC ............................... 52/749.14, 122.1, 747.12
See application file for complete search history.

(56) References Cited

U.S. PATENT DOCUMENTS

| | | | | |
|---|---|---|---|---|
| 3,871,154 A | * | 3/1975 | Iglehart | E04G 21/20 182/19 |
| 4,708,562 A | * | 11/1987 | Melan | F27D 1/1621 266/281 |
| 4,720,226 A | * | 1/1988 | Legille | F27D 1/1621 266/281 |
| 4,787,796 A | * | 11/1988 | Melan | F27D 1/1621 414/10 |
| 4,827,689 A | * | 5/1989 | Lonardi | F27D 1/1621 52/749.15 |
| 5,284,000 A | * | 2/1994 | Milne | E04G 21/22 52/749.14 |
| 5,419,669 A | * | 5/1995 | Kremer | F27D 1/1621 266/281 |
| 8,825,208 B1 | * | 9/2014 | Benson | E04G 21/22 52/749.14 |
| 2015/0081092 A1 | * | 3/2015 | Jacobsen | B25J 9/065 700/245 |

(Continued)

FOREIGN PATENT DOCUMENTS

DE 2108482 9/1972
DE 2113644 9/1972

(Continued)

*Primary Examiner* — Joshua K Ihezie
(74) *Attorney, Agent, or Firm* — Nyemaster Goode, PC

(57) ABSTRACT

An automated brick laying system is provided including platform means, mortar application means for allowing mortar to be applied to a brick in use, and brick gripping means for allowing at least one brick to be gripped in use. At least one of the mortar application means and the brick gripping means is movably mounted on or to the platform means and is arranged to be independently movable relative to the platform means in use. At least one of the mortar application means and the brick gripping means is capable of or is arranged to undergo linear and/or sliding movement along at least three separate and pre-defined axes of movement in use.

18 Claims, 20 Drawing Sheets

(56) References Cited

U.S. PATENT DOCUMENTS

2015/0082740 A1\* 3/2015 Peters ..................... E04G 21/22
                                                    52/747.12

FOREIGN PATENT DOCUMENTS

NL          9201312     2/1994
WO          97/02397    1/1997

\* cited by examiner

AUTOMATED BRICK LAYING SYSTEM AND METHOD OF USE THEREOF

This invention relates to an automated brick laying system and to a method of use thereof.

Systems which allow the automation of a brick laying process are known. Such systems aim to remove construction problems associated with human error, they can reduce the risk of injury associated with human workers on a construction site, they can speed up the brick laying process significantly and they can reduce the number of workers required on a construction site. This can significantly reduce the time and costs associated with construction work.

Examples of automated brick laying systems are disclosed in U.S. Pat. No. 8,965,571 and US2015/0082740. The systems comprise a fixed gantry having a moveable platform, a robotic arm assembly and a mortar applicator mounted to the movable platform, a mortar transfer device operatively coupled to said mortar applicator and a brick transfer device. Control software is operatively coupled to the robotic arm assembly and a sensing and positioning component is provided for controlling placement of the movable platform and robotic arm assembly. The platform as a whole and the robotic arm assembly can be moved through six axes of motion: X, Y, Z, pitch, roll and yaw. The brick to be laid is moved towards the mortar applicator for mortar to be dispensed on to the same. The brick then undergoes vibratory movement to move the mortar on the brick into a required position. The brick is laid onto the building using the robotic arm assembly. There is disclosure in this document of having the platform attached to a boom truck to allow movement of the platform in use but this requires an operator to drive the truck into a new position each time the boom supporting the platform has reached the limit of its movement range. There is also disclosure of the mortar applicator undergoing a limited range of movement relative to the brick held by the robotic arm assembly.

Problems associated with the abovementioned automated brick laying systems are that they still require a number of operators to be present, such as an operator that is located on the moveable platform, an operator required to move the moveable platform via moving the gantry or boom truck and the like. Thus, the process is still relatively labour intensive. In addition, the mortar applicator is either stationary or undergoes a limited range movement relative to a brick held by the robotic arm assembly. As a result, only one brick can be processed by the system at any time. Furthermore, the above system requires a vibratory system to be associated with the robotic arm assembly to vibrate the mortar and brick prior to the brick being laid to ensure even distribution of the mortar on the brick.

A further example of an automated brick laying system is disclosed in EP1977058. In this system a moveable support structure is provided, such as a boom truck, cherry picker and/or the like, which is coupled to a brick laying and adhesive applying head. The head comprises a manipulator for laying bricks, and a manipulator for applying mortar. The mortar is applied onto a previously laid brick in preparation for a new brick to be laid onto the mortar. Positioning of the head via the moveable support structure provides course positioning, whereas positioning of the manipulators provides fine positioning. Each of the manipulators is movable through a limited range of movement in space in 5-6 degrees of freedom of movement. A measurement system is provided which measures the position of the manipulators in real time and space and produces positional data. A controller receives the positional data and produces control data to control the positioning of the bricks and mortar via the manipulators.

It is an aim of the present invention to provide an improved automated brick laying system.

It is a further aim of the present invention to provide a method of using an improved automated brick laying system.

It is a yet further aim of the present invention to provide a rail system for use with an automated brick laying system.

It is a yet further aim of the present invention to provide a method of using a rail system for use with an automated brick laying system.

According to one aspect of the present invention there is provided an automated brick laying system, said automated brick laying system including platform means, mortar application means for allowing mortar to be applied to a brick in use, and brick gripping means for allowing at least one brick to be gripped in use, and wherein at least one of the mortar application means and the brick gripping means is movably mounted on or to the platform means and is arranged to be independently movable relative to the platform means in use, and wherein said at least one of the mortar application means and the brick gripping means is capable of or is arranged to undergo linear and/or sliding movement along at least three separate and pre-defined axes of movement in use.

Thus, at least one of the mortar application means and the brick gripping means are capable of pre-defined linear or uni-directional movement and/or sliding movement through at least three possible degrees of freedom of movement. This is in contrast to some prior art mechanisms which use pivotal robotic arms where the movement is pivotal and therefore non-linear, the movement is not provided along an axis and is also not along pre-defined pathways. The present invention offers a more stable automated brick laying system that can be provided on a relatively compact scale and can provide greater strength and stability along the pre-defined pathways or axes of movement.

Preferably the axes of movement are pre-defined in that there are physical/structural set pathways for movement provided along said axes which the mortar application means and/or brick gripping means have to follow.

Preferably these pre-defined axes or physical/structural set pathways for movement are provided or defined on the platform means.

In one embodiment both the mortar application means and the brick gripping means are arranged to be independently movable with respect to the platform means and/or to each other in use. For example, each of the mortar application and the brick gripping means are independently movably mounted on or to the platform means. Preferably in this embodiment the pre-defined axes or physical structural set pathways of movement of the brick gripping means and the mortar application means are distinct and separate to each other.

In this embodiment, since the brick gripping means and mortar application means are independently moveable and both undergo a relatively wide range of movement, the brick gripping means is operable to pick up, release and/or grip a brick simultaneously or substantially simultaneously to the mortar application means applying mortar to a different brick or brick that has already been laid. This significantly speeds up the automated brick laying process compared to some conventional automated brick laying processes.

In one embodiment the mortar application means and the brick gripping means are combined or form a combined unit.

For example, the brick gripping means could be mounted to at least part of the mortar application means, or the mortar application means could be mounted to at least part of the brick gripping means.

Preferably in this embodiment the combined unit is arranged such that one of the mortar application means or brick gripping means is arranged to move independently of the other in at least one of the pre-defined axes, such as for example the Y-axis. Preferably in this embodiment one of the mortar application means or brick gripping means is arranged to follow movement of the other, or is arranged to have combined movement with the other, in at least two pre-defined axes, such as for example the X-axis and Z-axis.

In this embodiment, since the mortar application means and the brick gripping means are combined, this reduces the complexity and cost of the apparatus.

In one embodiment one of the mortar application means and the bricking gripping means can move independently of the other in one of the pre-defined axes (i.e. the Y axis) but can also follow movement of the other or have combined movement with the other in at least three pre-defined axes (i.e. the X-axis, the Y-axis and the Z-axis).

Preferably a portion of the mortar application means and/or brick gripping means physically interfaces with a movement mechanism in each of said pre-defined axes or pathways.

Preferably the linear or uni-directional movement undertaken by the mortar application means and/or brick gripping means along at least the three pre-defined axes or pathways is reciprocal linear movement (i.e. forwards/backwards, left/right or up/down movement).

Preferably the brick gripping means and/or the mortar application means is arranged so as to be capable of moving through at least six possible degrees of freedom of movement, and/or along or about at least six pre-defined axes of movement in use.

Preferably the at least three pre-defined axes of movement of the mortar application means and the brick gripping means is along Cartesian axes, or an X-axis, a Y-axis and a Z-axis.

Preferably the mortar application means and/or the brick gripping means undergo sliding and/or linear motion in the Cartesian axes, (i.e. in the X-axis, Y-axis and Z-axis).

In one embodiment the mortar application means and/or the brick gripping means moves along at least two pre-defined axes of motion at the same time (i.e. the mortar application means can along an X-Axis and a Y-axis at the same).

Preferably the at least six degrees of freedom of movement or six pre-defined axes of movement of the brick gripping means and/or mortar application means is in or along an X-axis, a Y-axis, a Z-axis, and then also about a pitch axis, a roll axis and a yaw axis. The ability to control the brick gripping means and/or mortar application means in at least 6 degrees of freedom of movement allows the brick and/or mortar for a brick to be orientated precisely on the construction being built in use.

Preferably movement of the mortar application means and/or brick gripping means along the at least three pre-defined axes of movement in the Cartesian planes is linear and/or sliding movement.

Preferably movement of the mortar application means and/or brick gripping means about a pitch axis, roll axis and/or yaw axis is rotational movement, such as for example rotation about a rotational shaft.

In one embodiment the mortar application means is arranged to undergo movement in the X-Axis, Y-axis and Z-axis, and also about a pitch axis and a yaw axis, but not a roll axis.

Preferably the mortar application means is arranged to move such that it can apply mortar to a brick already laid as part of the construction being built in use.

Preferably the mortar application means is arranged to apply mortar across at least a horizontal surface of an already laid brick, and further preferably is arranged to apply mortar on a vertical surface of an adjacent already laid brick (if present) to which the "about to be laid brick" will engage with in use.

The platform means can be defined as any type of platform to which the mortar application means and/or brick gripping means can be movably mounted.

Preferably the platform means includes a frame, and further preferably a rigid or substantially rigid frame.

Preferably the mortar application means and/or the brick gripping means are arranged for movement along and/or relative to one or more frame elements of the platform means or frame in use.

Preferably the mortar application means and/or the brick gripping means are arranged for movement along or relative to one or more frame elements of the platform means or frame directly or indirectly.

Preferably the mortar application means and/or the brick gripping means are arranged to undergo sliding and/or linear movement relative to the platform means or along the one or more frame elements of the platform means or frame in use.

Preferably drive means are provided on or associated with the mortar application means and/or the brick gripping means to allow movement of the same along the pre-defined axes or pathways to be generated.

Preferably the drive means includes any or any combination of one or more motors, geared motors, electrical motors, hydraulic means, pneumatic means and/or the like.

Preferably at least one separate motor or drive means is provided for driving movement of the mortar application means and/or the brick gripping means in use in each of the pre-defined axes of movement that said means is capable of undertaking. Thus, in one example, at least six separate motors or drive means are provided for use with the brick gripping means or combined brick gripping means and mortar application means unit, three to allow movement along the X, Y and Z axes and three to allow movement in the pitch, roll and yaw axes.

In one embodiment at least three separate motors or drive means are provided for use with the mortar application means and/or brick gripping means to allow independent movement along the three pre-defined axes or X, Y and Z axes.

In one embodiment one or more of the motors or drive means for the mortar application means and/or the brick griping means are provided on or associated with a support structure or means relative to which the platform means can move in use and/or with the platform means or frame.

In one embodiment one or more of the motors or drive means for the mortar application means and/or brick gripping means are provided on or associated with the mortar application means and/or brick gripping means, such as for example a body portion of the mortar application means and/or brick gripping means.

In one embodiment the platform means is movably mounted on support means or a support structure to allow relative movement of the platform means with respect to the support means or support structure in use.

Preferably the support means or support structure is an upright, vertical or substantially vertical structure.

Preferably the platform means are arranged to be movable along a vertical axis, Y-axis or upright axis relative to the support means or support structure in use. Thus, for example the platform means is arranged to move in a direction parallel to a longitudinal axis of the support means or support structure in use.

Preferably the platform means is arranged to be movable within the support means or support structure in use, such as for example within a cavity or recess defined by the support means or support structure.

In one embodiment the support means or support structure is in the form of a frame.

In one embodiment the support means or support structure is in the form of a frame which is supported in place by one or more guide wires. The guide wires in one example can be attached between a part of the frame and a base and/or ground surface on which the frame is located in use.

Preferably the frame of the support means or support structure includes one or more frame members.

Preferably the support means or support structure is modular in form in that any number of frame members can be used to provide a structure of a required height.

Preferably the required height is at least equal to the height of the building or construction being built using the system.

Preferably two or more of the frame members are telescopically mounted to allow adjustment of the height and/or dimensions of the support means or support structure in use. Thus, for example, the support means or support structure is telescopically adjustable in use. This increases the ease of transport and/or storage of the support means or support structure.

Preferably two or more frame members are connected via connection means to form the support means or support structure in use.

In one embodiment the support means or support structure includes a single integral frame.

Preferably the connection means includes any or any combination of one or more screws, nuts and bolts, inter-engaging members, welding, adhesive and/or the like.

In one embodiment each, or one or more of, the frame members has a channel defined therein. Preferably a longitudinal axis of an opening of said channel is provided vertically, upright or in the Y-axis in use.

Preferably the channel defined in the one or more frame members has a U-shaped, C-shaped or substantially U-shaped or C-shaped cross section. Preferably a longitudinal axis of an opening of the U-shaped or C-shaped cross section is provided vertically, upright or in the Y-axis in use.

Preferably one or more surfaces or edges of the platform means has one or more movement means, wheels, bearings, rollers and/or the like associated with the same to allow movement, and preferably slidable movement, control, alignment and/or guidance of the platform means with respect to the channel defined in the one or more frame members in use.

In one example the support means or support structure is approximately 7 metres in height, but the modular nature and/or telescopic nature of the frame members could allow the support means or support structure to be any required height.

In one embodiment movement means are provided on or associated with the platform means and/or support means or support structure for allowing movement of the platform means relative to the support means or support structure in use.

Preferably the movement means are arranged to allow movement of the platform means between raised and lowered positions with respect to the support means or support structure in use.

In one example the movement means includes a hoist system, lifting system, chain driven lifting system and/or the like.

In one example the movement means is provided at or adjacent a top or upper part of the support means or support structure for allowing movement of the platform means between the top or upper part and a base or lower part of the support means or support structure in use. However, at least part of the movement means could be provided on or associated with a base or lower part of the support means or support structure if required.

In one embodiment brick transfer means or unit are provided on or associated with the support means or support structure for allowing one or more bricks to be transferred or moved relative to the support means, support structure and/or platform means in use. In one example, the brick transfer means or unit could be connected directly or indirectly to the support means or support structure.

Preferably the brick transfer means or unit allows one or more bricks to be transported from a storage position, ground, base or lower level of the system to an in-use position, a raised or upper level of the system in use, and preferably to a level and/or position at which the platform means is located in use.

Preferably the brick transfer means or unit allows one or more bricks to be transported from a storage position or one or more shelf units provided on or associated with the support means, support structure or brick transfer means to a position where the brick gripping means of the apparatus is located.

Preferably the storage position or one or more shelf units are provided at a ground, base of the system or at a lower level relative to the position at which the brick gripping means is provided.

In one embodiment the one or more shelf units are arranged to move vertically with respect to the support structure or support means in use via the brick transfer means or unit.

Preferably the brick transfer means or unit are movably mounted on and/or movable relative to the support means or support structure in use.

Preferably the brick transfer means or unit are movably mounted on and/or movable relative to the support means or support structure along a vertical, substantially vertical or upright axis in use.

Preferably the brick transfer means or unit are arranged to allow movement of one or more bricks and/or shelf units between relatively raised and relatively lowered positions with respect to the support means or support structure in use.

In one example the brick transfer means or unit includes or is moved via a hoist system, conveyor system, geared lifting system and/or the like.

Preferably the brick transfer means or unit are arranged to allow movement of one or more bricks from a start position or brick storage position to a brick gripping position to allow the brick gripping means to grip a brick in use.

In one example the brick transfer means hoist system is provided at or adjacent a top or upper part of the support means or support structure for allowing movement of the brick transfer means between the top or upper part and a base or lower part of the support means or support structure in use. However, at least part of the movement means could be provided on or associated with a base or lower part of the support means or support structure if required.

Preferably the brick transfer means or unit is provided with conveying means to allow one or more bricks to be moved along a part of the brick transfer means in use, and further preferably along a horizontal axis.

Preferably the brick transfer conveying means include one or more conveying belts, rollers, wheels, pulleys, rotatable drums and/or the like.

Preferably brick receiving means or unit is provided for receiving one or more bricks from the brick transfer means in use.

In one embodiment the brick receiving means includes conveying means to allow a brick to be moved from the brick transfer means onto the brick receiving means in use.

Preferably the brick receiving conveying means include one or more conveying belts, rollers, wheels, pulleys, rotatable drums and/or the like.

Preferably the brick receiving means is mounted or fixedly mounted on the platform means.

Preferably the brick gripping means or unit is movable relative to said platform means to receive and/or take one or more bricks from the brick receiving means or unit in use.

In one embodiment the mortar application means or unit includes at least one mortar dispensing nozzle or outlet for dispensing mortar therefrom in use.

Preferably the mortar application means includes a body portion and the at least one mortar dispensing nozzle is provided on or associated with the body portion.

Preferably mortar reservoir means are provided for containing mortar therein in use. One example of mortar reservoir means is a mortar hopper.

Preferably the mortar reservoir means is provided on or associated with the platform means.

Preferably one or more conduits, pipes, channels, tubing and/or the like are provided between the mortar reservoir means and the mortar application means or mortar dispensing nozzle to allow mortar to move from the reservoir means to the at least one dispensing nozzle in use.

Preferably pump means are provided on or associated with the mortar application means and/or mortar reservoir means to allow mortar to be pumped or conveyed from the reservoir means to the mortar dispensing nozzle in use.

In one example, drive means or a motor are provided on or associated with the pump means for allowing driving of the pump means in use.

In one embodiment the pre-defined X, Y and/or Z axes or pre-defined pathways of movement along which the mortar application means and/or brick gripping means are movable include one or more support arms.

Preferably at least a part of the mortar application means and/or brick gripping means are movable mounted on said support arms, such as for example, via an interface and/or the like.

In one embodiment one or more of the support arms are movably mounted on one or more other support arms.

In one embodiment the mortar application means and/or body portion of the mortar application means are movably mounted on the platform means for allowing movement along a Z-axis, and preferably are movably mounted on a Z-axis support arm provided on or associated with the platform means for allowing movement along a Z-axis.

In one embodiment the Z-axis support arm is movably mounted on an X-axis support arm for movement along an X-axis. The X-axis support arm is typically provided on or associated with the platform means.

In one embodiment the X-axis support arm is movably mounted on a Y-axis support arm for movement along a Y-axis. The Y-axis support arm is typically provided on or associated with the platform means.

Preferably one or more motors or drive means are provided on or associated with each of the X-axis, Y-axis and Z-axis support arms to allow movement of the mortar application means and/or support arms relative to each other in the required direction in use.

Preferably the mortar application means are slidably movable in or along the X-axis, Y-axis and/or Z-axis or along support arms provided in the X-axis direction, the Y-axis direction and/or the Z-axis direction in use.

In one embodiment the mortar application means and/or body portion of the mortar application means are movably mounted to the brick gripping means for movement along a Y-axis, and preferably are movably mounted on a Y-axis support arm provided on or associated with the brick gripping means for allowing movement along the Y-axis independently of the brick gripping means.

In one embodiment the support means or support structure is movably mounted on or movable relative to a rail system in use.

Preferably the rail system is arranged to allow movement of the support means or support structure in a horizontal plane, across a ground surface and/or X-axis in use.

In one example, the rail system is floor or ground mounted.

Preferably the rail system is arranged to allow movement of the support means or support structure in a direction transverse or perpendicular to a longitudinal axis of the support means or support structure in use.

Preferably the support means or support structure is movable relative to the rail system independently of the movement of the platform means relative to the support means or support structure, and further independently of movement of the brick gripping means and mortar application means with respect to the platform means.

Preferably the rail system is located around one or more peripheral edges of a location, foundations or area on which a building, wall or construction is to be constructed in use.

Preferably the rail system is located adjacent and/or around an exterior of one or more peripheral edges of a location, foundations or area on which a building, wall or construction is to be constructed in use. However, it could be located adjacent an interior of one or more peripheral edges of a location, foundation or area on which a building, wall or construction is to be constructed in use if required.

Preferably the rail system is located directly on a ground surface in use, or it can be located indirectly on the ground surface via one or more support feet or foot means if required.

Preferably the rail system includes one or more rail members that are arranged in a required orientation and location in use.

Preferably the rail members are arranged in an end to end manner.

Preferably each of the rail members is provided with engagement means for allowing engagement with at least one other rail member in use.

Preferably engagement means are provided on or associated with two or more edges, opposite ends, surfaces and/or the like of the rail members to allow two or more further rail members to be engaged to a rail member in use.

Preferably the engagement means includes any or any combination of one or more clips, nuts and bolts, screws, inter-engaging members, male/female connections, mechanical engagement, electrical connections and/or the like.

Preferably the rail members include one or more linear rail members and/or one or more corner rail members. Preferably the one or more corner rail members are arranged to provide any required angle of a corner of a construction, building, wall and/or the like. For example, the one or more corner rail members could be curved to provide angle of 90 degrees, such that the adjoining rail members to the corner rail member are provided at 90 degrees to each other.

Preferably the one or more rail members are U-shaped, C-shaped or substantially U-shaped or C-shaped in formed.

Preferably each rail member has a channel defined therein and an opening of the channel faces an opposite rail member channel provided a spaced distance apart therefrom.

In one embodiment the one or more rail members or foot members are joined to or extend from the foundations of the wall, building or construction to be constructed.

Preferably the one or more rail members and/or foot members are joined to the ground, to foundations of a construction or to each other via fixing means, such as for example via one or more bolts, screws, anchors, pins, inter-engaging members and/or the like.

Preferably the rail system is modular in that any or any combination of one or more rail members can be joined together to form a required shape in use.

In one embodiment one or more plate members can be provided on or between one or more rail members. Preferably a plate member is provided between two or more spaced apart rail members. The plate members help to protect the rail members from debris, weather conditions and/or the like and act as an anti-trip means to prevent injury to workers on the construction site.

Preferably the one or more plate members include anti-slip means thereon for preventing or reducing slip of the support means, support structure or any worker thereon in use, and preferably the anti-slip means are provided on an upper surface of the same.

In one example the one or more plate members are formed from or include aluminium, an aluminium alloy and/or the like.

In one embodiment the rail system incorporates an induction power transfer system to allow movement of the support means or support structure relative to the same in use. Use of this system removes the problems associated with trailing electrical cables that can become accidentally trapped in moving components or can cause a trip hazard on the construction site.

In one embodiment the rail system incorporates or includes a SEW Eurodrive MOVITRANS® system, a contactless electrical transfer system and/or the like. Such systems can be used to transfer electrical energy from a ground mounted or rail mounted electrical power supply to the support means, support structure, platform means and/or the like.

In one embodiment the rail system comprises a contact based electrical transfer system where electrical energy can be transferred from the one or more rail members to one or more electrical connectors provided on or associated with the support structure or means.

In one embodiment the rail system and/or support means or support structure includes a mechanical drive system, a rack and pinion system, a chain rack and pinion system and/or the like to allow movement of the support means or support structure relative to the same in use.

In one embodiment a rack system is provided on or associated with the one or more rail members and a pinion system is provided on or associated with the support means or support structure, or base means or member of the support means or support structure.

Preferably resilient biasing means are provided to bias one or more teeth members of the rack system or chain rack into engagement with one or more teeth members of the pinion in use. For example, the resilient biasing means can include any or any combination of one or more springs, compression/tension springs, sprung material and/or the like.

In one embodiment clamping means are provided to allow clamping of part of the support means or support structure with the rail system in use.

Preferably the clamping means includes one or more clamping wheels or members.

Preferably location means are provided on or associated with the rack and/or pinion system for maintaining the rack and/or pinion system a required distance apart from each other in use to allow sufficient meshing of one or more teeth members of the rack and pinion system in use.

In one embodiment the location means is in the form of a wheel, roller, rotatable drum, bearing, slider, follower and/or the like.

Preferably the location means engages with a part of the one or more rail members and is slidably movable relative to the same in use.

Preferably the speed at which the support means or support structure is movable on or relative to the rail system is controlled by control means in use.

Preferably a pair of rail members are provided a parallel and spaced distance apart from each other.

Preferably the speed of operation of the support means or support structure on or relative to the rail system is variable and can be adjusted by a user as required. For example, the speed could be up to 300 mm/s.

Preferably the support means or support structure includes a base member or base plate on which an upright frame is located in use.

Preferably the upright frame of the support means or support structure protrudes outwardly and upwardly from the base member or base plate in use.

Preferably the base member or base plate is movably mounted or movable relative to the one or more rail members in use.

In one embodiment the base member or base plate is in the form of a movable tray, bogie or trolley that is capable of movement on or relative to the rail system in use.

In one embodiment the base member or base plate includes drive means, one or more motors, geared electrical motor, hydraulic means, pneumatic means and/or the like to drive movement of the support means or support structure on or relative to the rail system in use.

In one embodiment control means or a control unit are provided on or associated with the system to allow control of one or more parameters of the brick laying system in use, such as for example, controlling the movement of one or more parameters of the support means or support structure on the rail system, controlling the movement of one or more parameters of the brick transfer means, controlling the movement of one or more parameters of the platform means, controlling the movement of one or more parameters of the mortar applicator means, controlling the movement of one or more parameters of the brick gripping means and/or the like.

For example, the one or more parameters could include the speed, timing and/or volume of mortar being dispensed from the mortar application means; the speed, timing and/or position of the brick gripping means; the position and/or speed of movement of the platform means relative to the support means; the position and/or speed of movement of the support means relative to the rail system and/or the like.

Preferably the control means or control unit includes any or any combination of micro-processing means, a computer, software, hardware, memory means, data storage, data input means, display means, user interface means and/or the like.

In one embodiment architectural drawings, detailed drawings, CAD drawings, data, construction data and/or information are input into the micro-processing means of the control means to allow the system to calculate where each brick or building element of the construction needs to be located.

Preferably one or more sensing means, position sensing means, location sensing means and/or the like are provided with the brick laying system so that the position of any or any combination of the brick laying components, support means or support structure, the platform means, the brick gripping means, the mortar application means, the brick transfer means, brick on the brick receiving means and/or the like can be sensed, monitored and/or calculated in use. Data relating to the sensed position of the one or more components can then be compared to data relating to the required position of the one or more components to allow one or more data signals or commands to be transmitted by the control means to move the one or more components to the required position in use.

In one embodiment position sensing means are provided on or associated with the rail system to allow the rail system to determine the position of the support means or support structure with respect to the same in use.

Preferably the one or more sensing means, position sensing means, location sensing means and/or the like includes a global positioning system (GPS), encoders, potentiometers, photoelectric means, hall effect sensors and/or the like.

In one embodiment sensing means are provided on or associated with the brick receiving unit to measure any or any combination of the height, length or depth of the brick received in the same. This measurement can then be used by the control means to determine what movement the brick gripping means needs to undertake in order to collect the brick from the brick receiving unit and locate it in a required place on the construction.

In one embodiment communication means can be provided on or associated with the system for allowing data to be communicated from the control means or control unit to one or more components of the system. The communication means can include wired or wireless means, such as for example, one or more cables, radio frequency, Bluetooth, infra-red, WIFI and/or the like.

In one embodiment of the present invention there is provided an automated brick laying system, said automated brick laying system including platform means, mortar application means for allowing mortar to be applied to a brick in use, and brick gripping means for allowing at least one brick to be gripped in use, and wherein the mortar application means and the brick gripping means are each movably mounted on the platform means and are arranged such that each of the mortar application means and the brick gripping means are independently movable relative to the platform means in use, and wherein each of the mortar application means and the brick gripping means are capable of linear and/or sliding movement along at least three separate and pre-defined axes of movement in use.

According to one aspect of the present invention there is provided a method of using an automated brick laying system, said automated brick laying system including platform means, mortar application means for allowing mortar to be applied to a brick in use, and brick gripping means for allowing at least one brick to be gripped in use, said method including the steps of moving at least one of the brick gripping means and/or mortar application means relative to the platform means to allow the brick gripping means to receive and grip at least one brick, applying mortar using the mortar application means to at least one brick laid in a construction position on a construction site, moving at least one of the brick gripping means and/or mortar application means to the construction position to allow the gripped brick to be placed on the mortar in the construction position, releasing said brick from the brick gripping means, and wherein said at least one of the mortar application means and the brick gripping means is capable of or is arranged to undergo linear and/or sliding movement along at least three separate and pre-defined axes of movement in use.

In one embodiment the brick gripping means is moved to the construction position prior to the mortar being applied at the construction position.

In one embodiment the mortar is applied at the construction position at the same time as the brick gripping means is moved to the construction position.

In one embodiment the brick gripping means is moved to the construction position after the mortar is applied at the construction position.

According to one aspect of the present invention there is provided an automated brick laying system, said automated brick laying system including platform means, mortar application means for allowing mortar to be applied to a brick in use, and brick gripping means for allowing at least one brick to be gripped in use, said platform means mounted directly or indirectly on a rail system and arranged such that the platform means is movable on or relative to said rail system in use.

The mortar application means can be defined as a unit capable of dispensing mortar therefrom in use.

The brick gripping means can be defined as a unit capable of receiving, gripping and releasing one or more bricks in use.

According to one aspect of the present invention there is provided a rail system for use with an automated brick laying system.

According to one aspect of the present invention there is provided a method of using a rail system for use with an automated brick laying system.

According to other independent aspects of the present invention there is provided brick gripping means; mortar application means; brick transfer means; brick receiving means; support means; platform means; brick storage means.

It will be appreciated that any automated brick laying system could be used with the rail system according to the present invention and is not limited to the automated brick laying system claimed herein.

The present invention has the following advantages:
Bi-directional or reciprocal movement of the mortar dispensing means in or along at least three axes of movement, thereby allowing mortar to be dispensed directly onto the construction being built rather than on a brick that is about to be laid. This removes the requirement for vibration systems to be incorporated into the system and reduces the weight associated with the brick being laid by the brick gripping means in use.

The brick gripping means of the present invention can be used to grip two or more different types and/or sizes of bricks and/or blocks using the same system at the same time (i.e. during the same construction process).

Bi-directional or reciprocal movement of the brick gripping means in or along at least six axes of movement, thereby allowing precise location of a brick in a required location on a construction in use.

The rail system of the present invention allows the automated brick laying system to be provided around any construction, building or wall being built, and can be provided around all walls of a building for example simultaneously, without the system having to be manually moved and readjusted each time the brick laying system reaches the limit of its operation.

The rail system provides a flexible and modular mechanical linear drive system in one embodiment in the form of a rack and pinion or chain rack and pinion to propel the support means or support structure around the rail system in use.

The rail system can incorporate two or more support means or support structures in use, thereby allowing brick laying or two activities to take place on a construction at multiple locations simultaneously. At least one of the support means or support structures could also be used to perform other activities or task at the same time as brick laying.

The pump used to transfer mortar from a mortar reservoir or hopper to the mortar application means or nozzle provides an efficient transfer of mortar in use.

A brick measuring system can be used with the brick laying system to ensure accurate brick positioning in use. For example, one or more photoelectric sensors could be used.

A non-contact power transfer system or a contact base power transfer system can be used with the rail system of the present invention. Such a system may include a power transfer receiving means provided on or associated with the support means or support structure and a power transfer transmitting means provided on or associated with the rail system to allow power, such as for example electrical power, to be transmitted between the rail system and the support means or support structure without the use of wires that could cause obstruction of movement of the support means or support structure on the rail system in use.

The support means or support structure can incorporate a lifting or hoisting mechanism to allow vertical movement or upright movement of the platform means relative to the support means or support structure in use. This allows the height of the platform means, the mortar application means and/or the brick gripping means to be adjusted vertically in use.

The support means or support structure incorporates a lifting or hoisting mechanism to allow vertical movement or upright movement of brick transfer means and/or brick storage means relative to the support means or support structure in use. This allows bricks or shelves of bricks to be transferred from ground level to a required height or vertical position with respect to the support means or support structure in use.

A unique brick laying control means and software arrangement is provided to control the components of the brick laying system.

The word "brick" used in this application refers to any type of brick, block, construction unit and/or the like that can be used in constructing an item, building, wall, construction and/or the like in use. The brick can be formed from any material, such as for example, clay, mud, concrete, metal, wood, rubber, plastic and/or the like.

Embodiments of the present invention will now be described with reference to the following figures, wherein.

Figure 1:
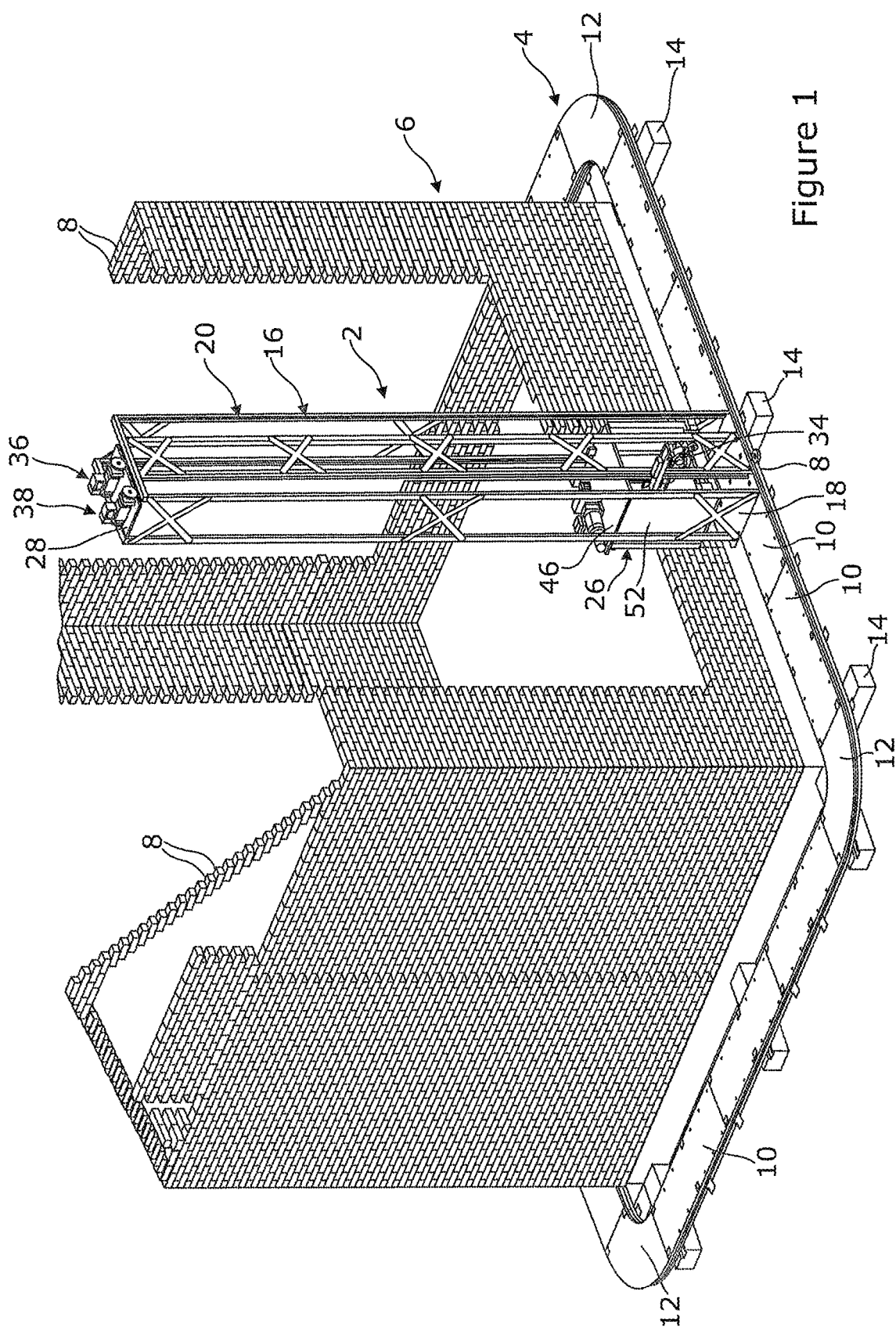
FIG. 1 is a perspective view of an automated brick laying system according to an embodiment of the present invention in use on a rail system according to an embodiment of the present invention.
Figure 2:
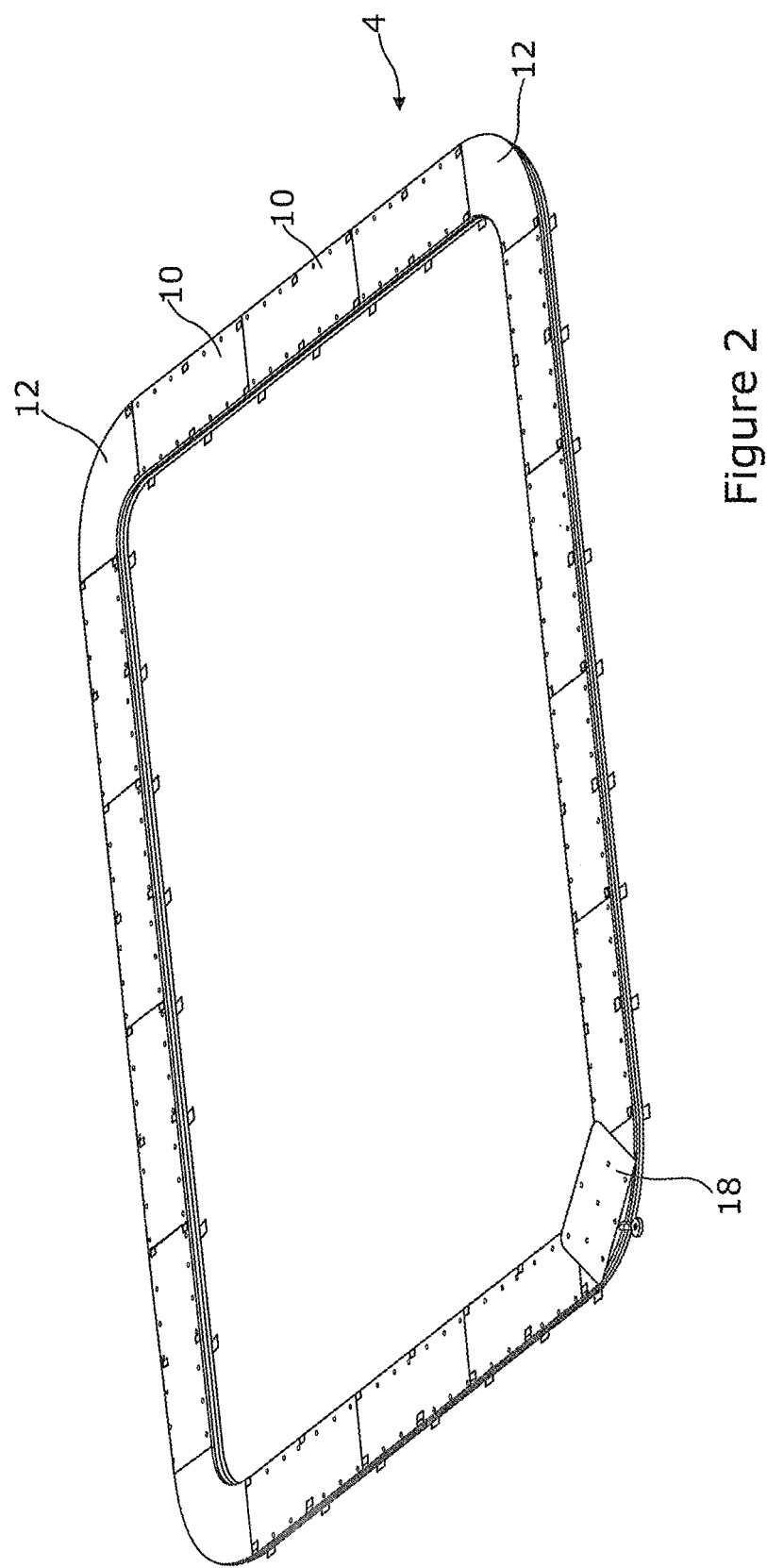
FIG. 2 is a perspective view of the rail system shown in FIG. 1 with the support means removed.

Referring to the FIGS. 1-9b, there is illustrated an automated brick laying system 2 for use on a rail system 4 according to an embodiment of the present invention. The automated brick laying system 2 is for automating the construction of a building 6 made from bricks 8.

The rail system 4 comprises a plurality of linear or straight rail member modules 10 that are arranged in an end to end manner to form an elongate rail, and curved corner rail member modules 12 that join the rail member modules 10 provided in different orientations. As such, a complete rail system 4 is provided around the external peripheral edge of the building 6 being constructed.

The rail member modules 10, 12 are typically located between feet members 14 to raise the rail members above a ground surface in use. This improves the ease with which the rail members can be leveled and prevents significant ground debris, mud, water and/or the like from getting on the same.

Figure 6:
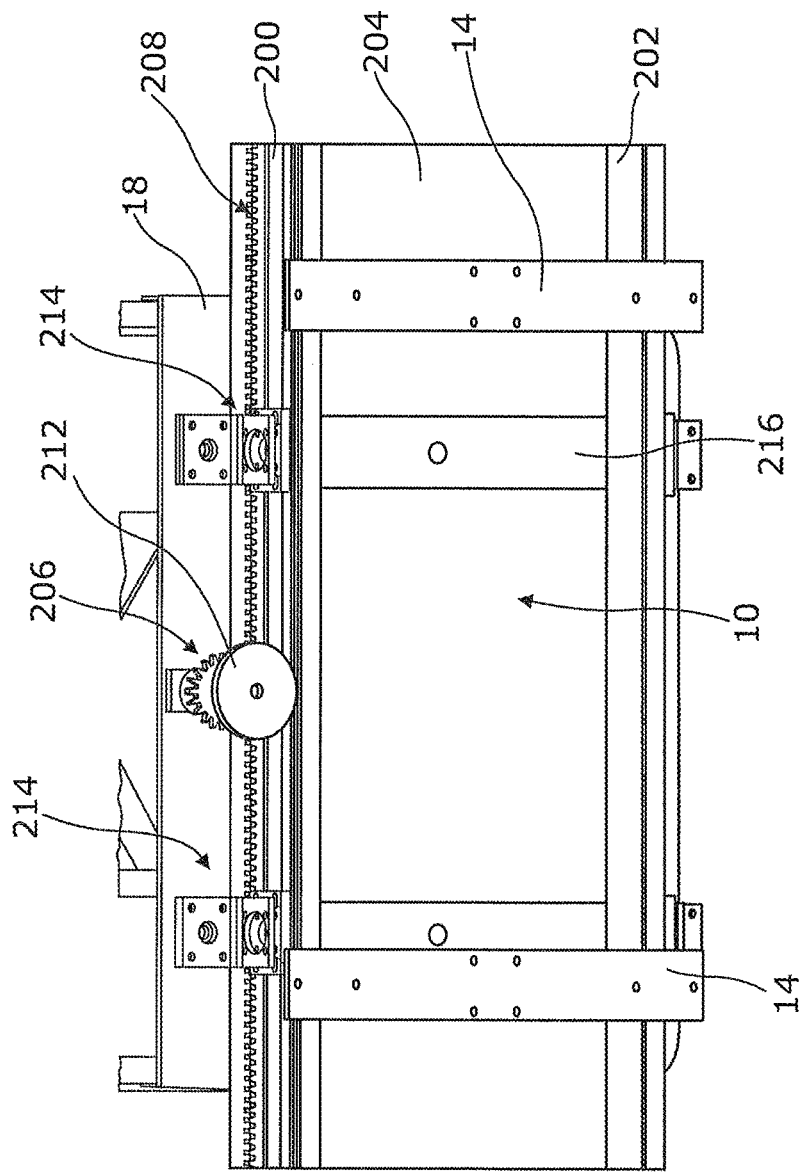
FIG. 6 is a base plan view of the rail system according to one embodiment.
Figure 7A:
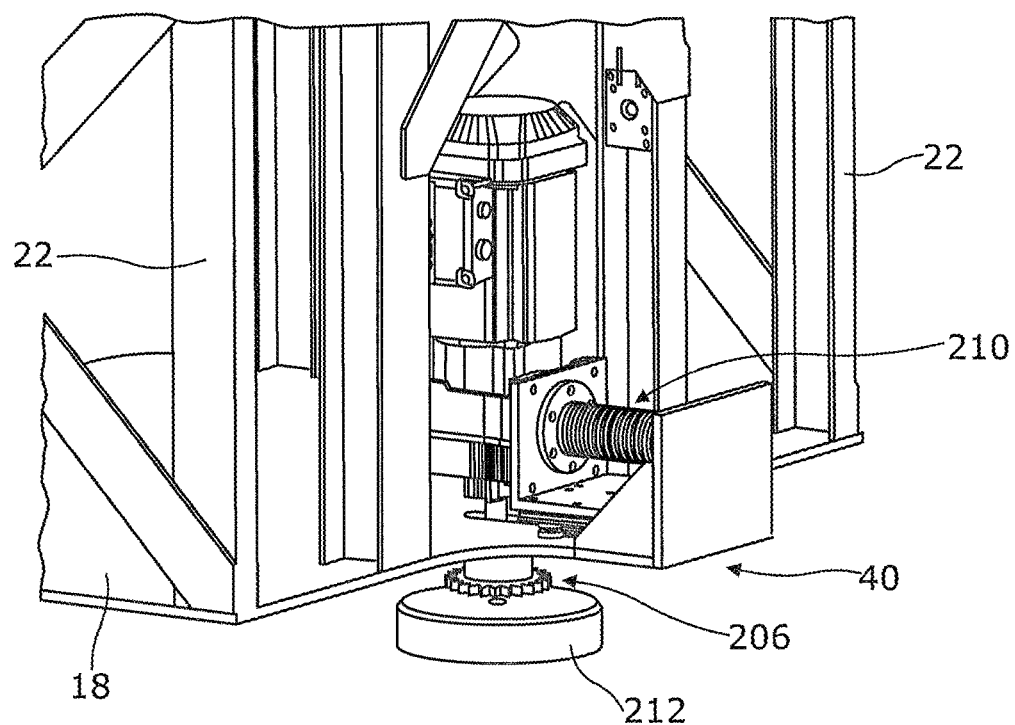
FIGS. 7a and 7b show an enlarged view of the base plate with the support structure, and of the base plate with the support structure removed according to one embodiment of the present invention.
Figure 7B:
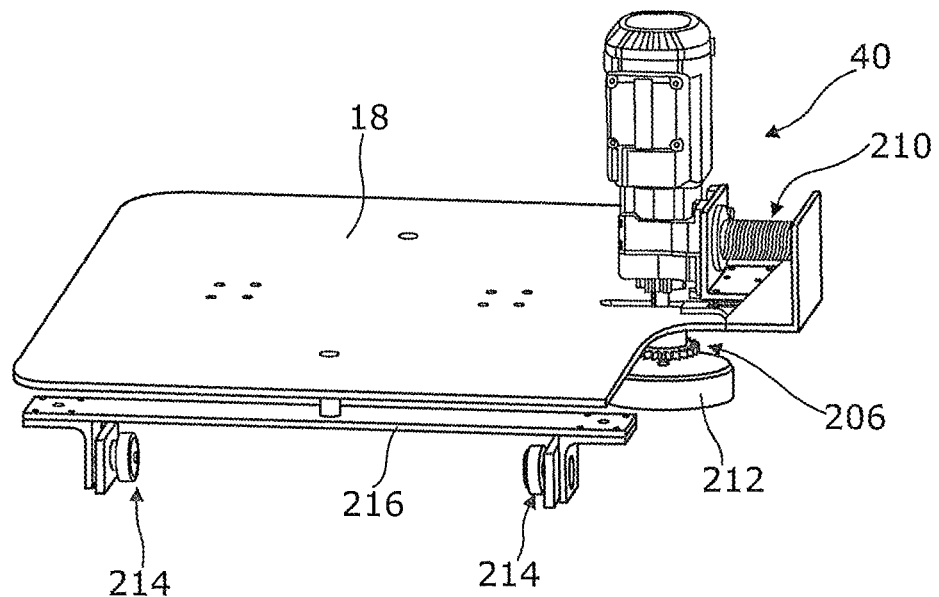
Figure 8:
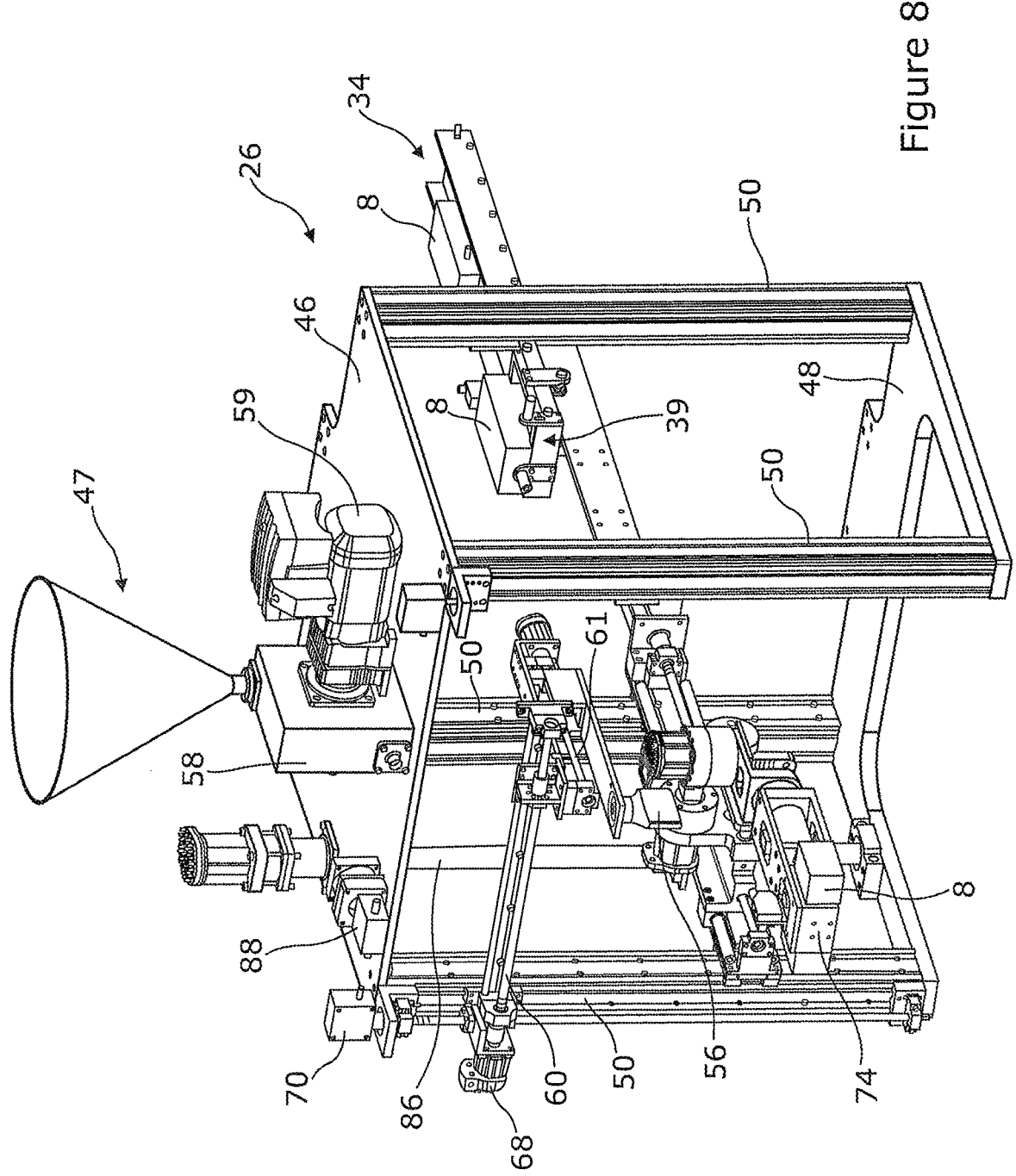
FIG. 8 is a smaller perspective view of the platform means shown in FIGS. 4a and 4b.

Each rail member module 10, 12 comprise a pair of rail members 200, 202 provided in a spaced apart and parallel configuration, as shown in FIG. 6. Each rail member 200, 202 has a channel defined therein and the opening to the channel (i.e. the main opening of the channel parallel to a longitudinal axis of the channel) faces towards the channel opening on the opposite rail member when assembled. A plate member 204 is located over the top of the rail members 200, 202 to protect the rail system from the weather and from debris that may fall on the same. At least a top surface of the plate member is provided with a non-slip surface so as to prevent a worker slipping on the same in use and to prevent the support structure 16 from slipping on the plate member 204 when in a stationary position on the same.

Support means or a support structure 16 is movably mounted on said rail member modules 10, 12. In particular, the support means or support structure 16 includes a base member or plate 18 which is movably mounted on the rail members 200, 202. A rigid frame 20 is joined to said base plate 18 and protrudes upwardly and vertically above said base plate 18. The frame 20 includes a number of upright or vertical frame members 22 with strengthening strut members 24 provided between the frame members 22 to create a rigid, strong and stable structure. A top member or plate 28 is provided at a top end 30 of the support structure opposite to the base end 32 at which the base plate 18 is provided. A longitudinal axis of the support structure is typically provided perpendicular to the rail member modules 10, 12.

The base plate 18 is in the form of a trolley or bogie for movement along the rail member modules in use. In particular, a pinion gear 206 protrudes outwardly from a lower surface of the base plate 18 for meshing with a rack system 208 provided on a surface of the rail members 200, 202. Drive means in the form of a motor 40 is provided on base plate 18 for driving movement of the rack and pinion arrangement and therefore for driving movement of the base plate 18 along the rail members 200, 202 in use.

The geared motor 40 and pinion 206 are meshed with the rack system 208 with the aid of a slide mechanism that incorporates a compression/tension spring 210 (or one or more followers or sliders can be provided). This slide mechanism is required to provide compliant engagement between the rack and pinion teeth while the trolley is propelled along the rail members 200, 202, and particularly around the rail members on the corner modules 12. The teeth engagement distance is maintained using a separate location wheel 212 mounted on the same axis as the drive for the pinion 206. The location wheel 212 engages with part of the rail members 200, 202 and is movable relative to the same in use.

Four bearings 214 are provided on the lower surface of base plate 18 that are designed to slidably move in the channels defined in each of the rail members 200, 202. The bearings 214 are mechanically connected in pairs running across the base plate 18 via a link plate 216. Each link plate 216 is interfaced with the lower surface of base plate 18 via a swivel connection point located in the centre of the link plate. The function of the bearings 214 is to transmit the vertical loads from the platform 26 to the support structure 16 via the rail member modules 10, 12, and to prevent the support structure 16 from toppling over, particularly when the weight of the platform 26 is towards a top of the support structure 16 in use.

Figure 3A:
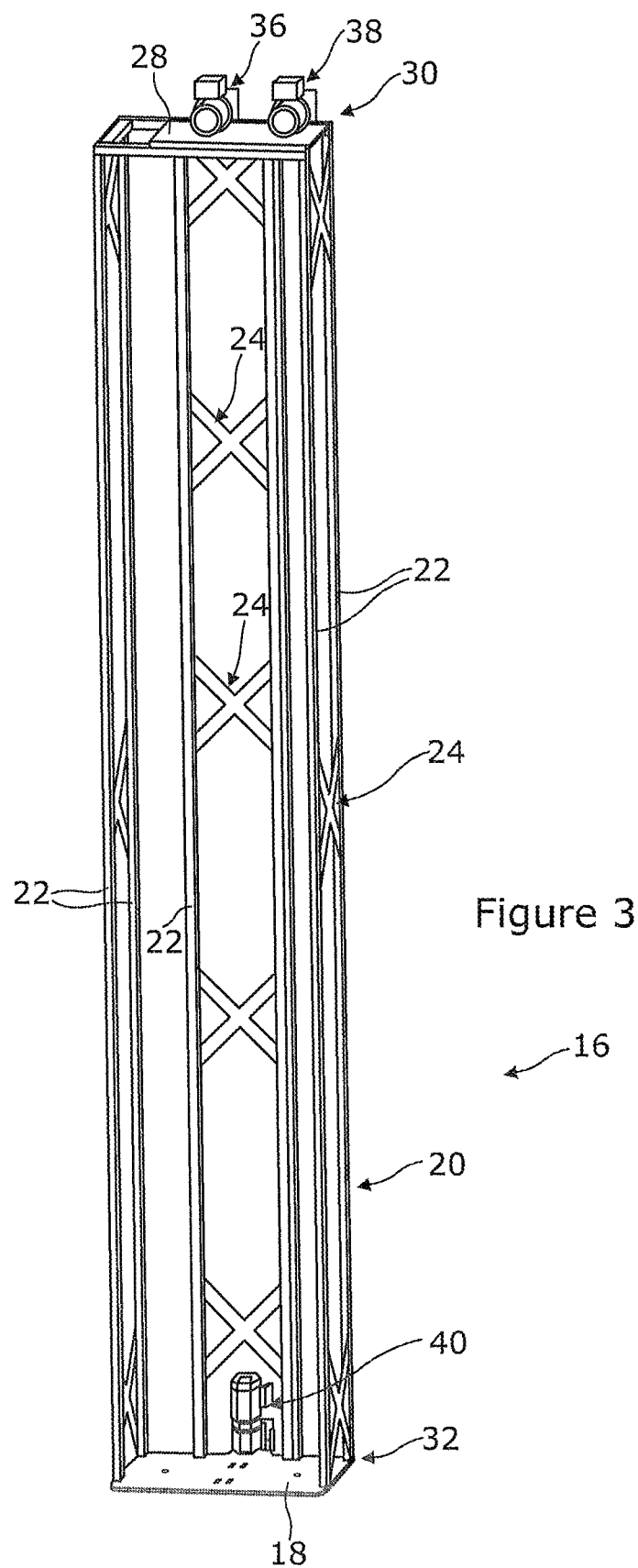
FIGS. 3a and 3b show a front perspective view and a rear perspective view of the support means shown in FIG. 1 respectively.
Figure 3B:
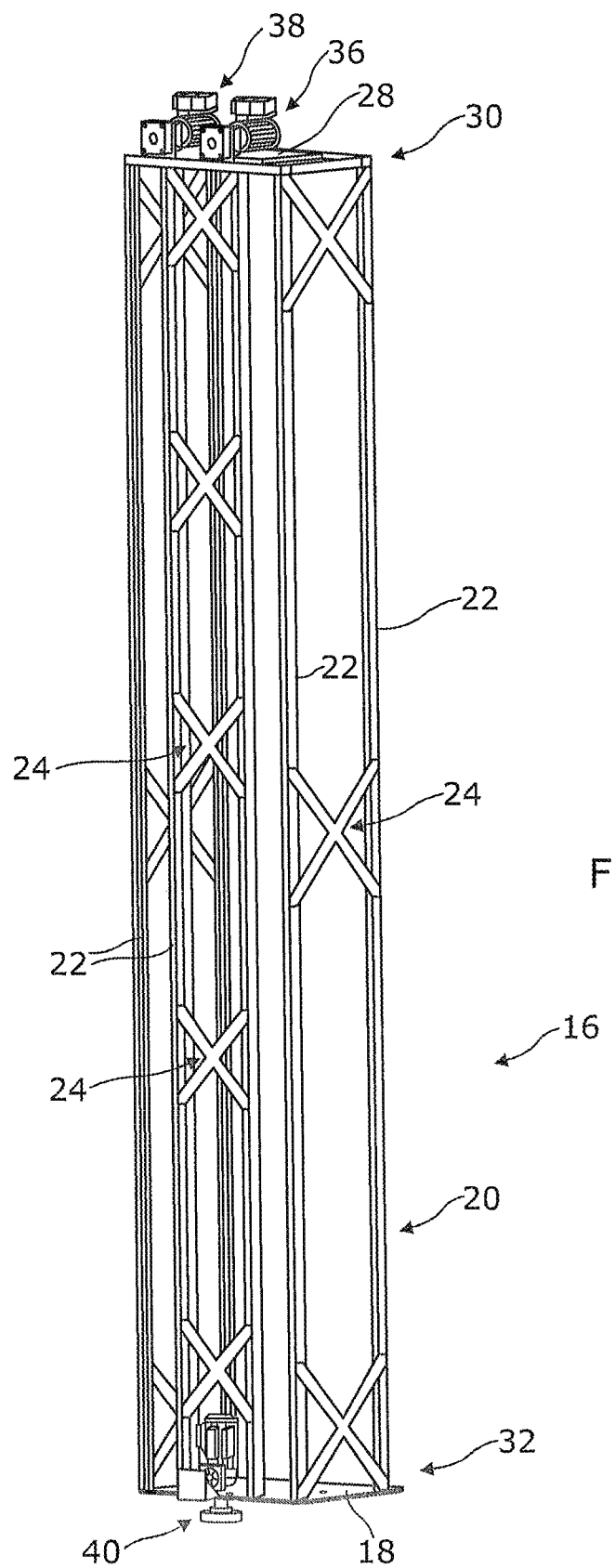

Platform means or platform 26 and brick transfer means or unit 34 are each independently movable within the support structure 16 via hoist systems 36, 38 provided on top plate 28, as shown in FIGS. 3a and 3b. The hoist systems 36, 38 allow the platform 26 and the brick transfer unit 34 to be moved along a vertical or Y axis (or along a longitudinal axis of the support structure) in an upwardly and/or downwardly direction as required.

The brick transfer unit 34 allows one or more bricks to be transferred from ground level to a brick receiving means or unit 39 provided on platform 26. The brick receiving unit 39 is typically fixedly attached to platform 26.

Platform 26 typically supports mortar application means or mortar application unit 42 and brick gripping means or a brick gripping unit 44. Each of the mortar application unit 42 and the brick gripping unit 44 are independently movable relative to the platform 26 along an X-axis, Y-axis and Z-axis in use.

Figure 4A:
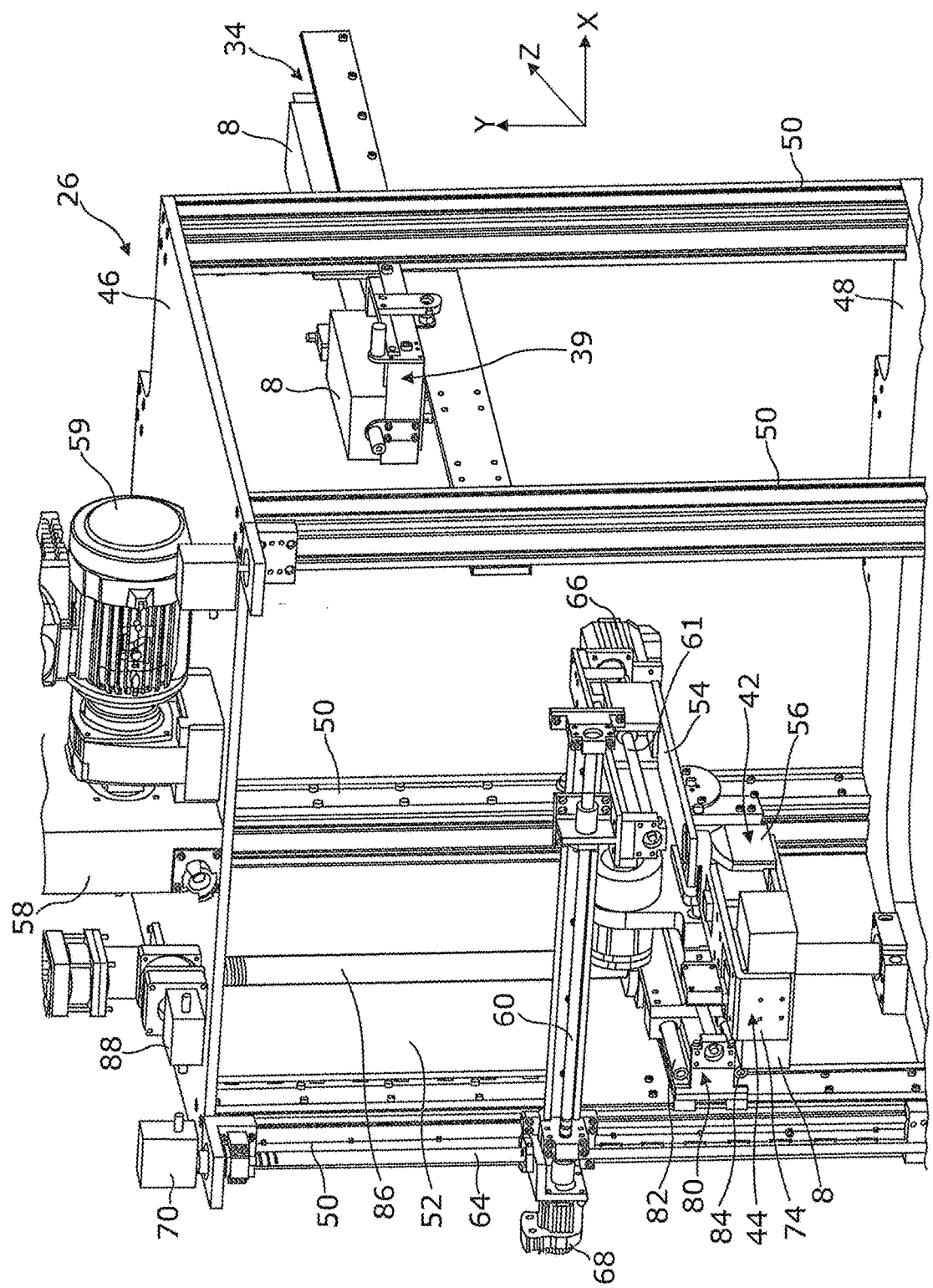
FIGS. 4a and 4b show an enlarged front perspective view and a front view of platform means that can be used with the system shown in FIG. 1 respectively.
Figure 4B:
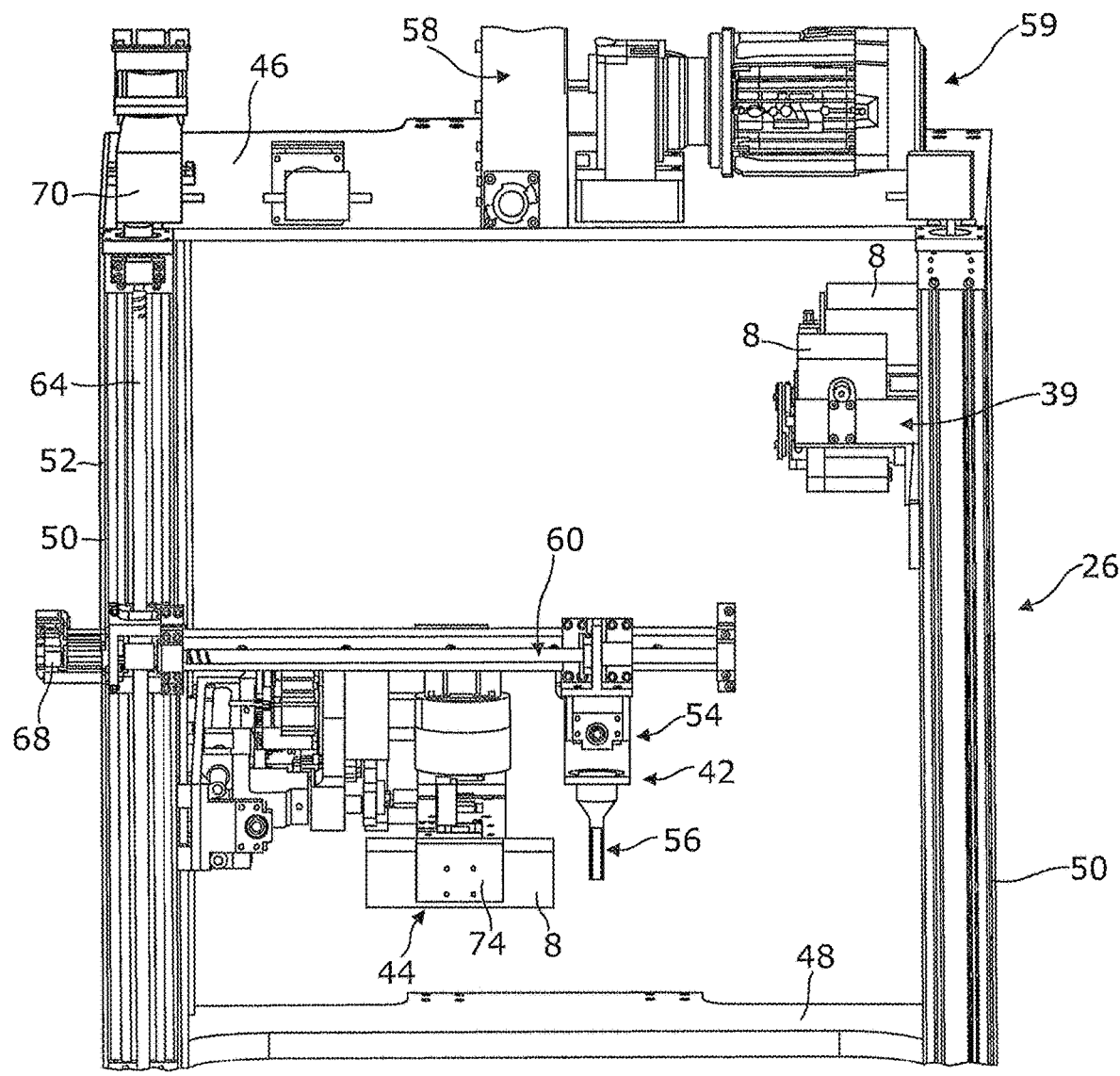
Figure 5A:
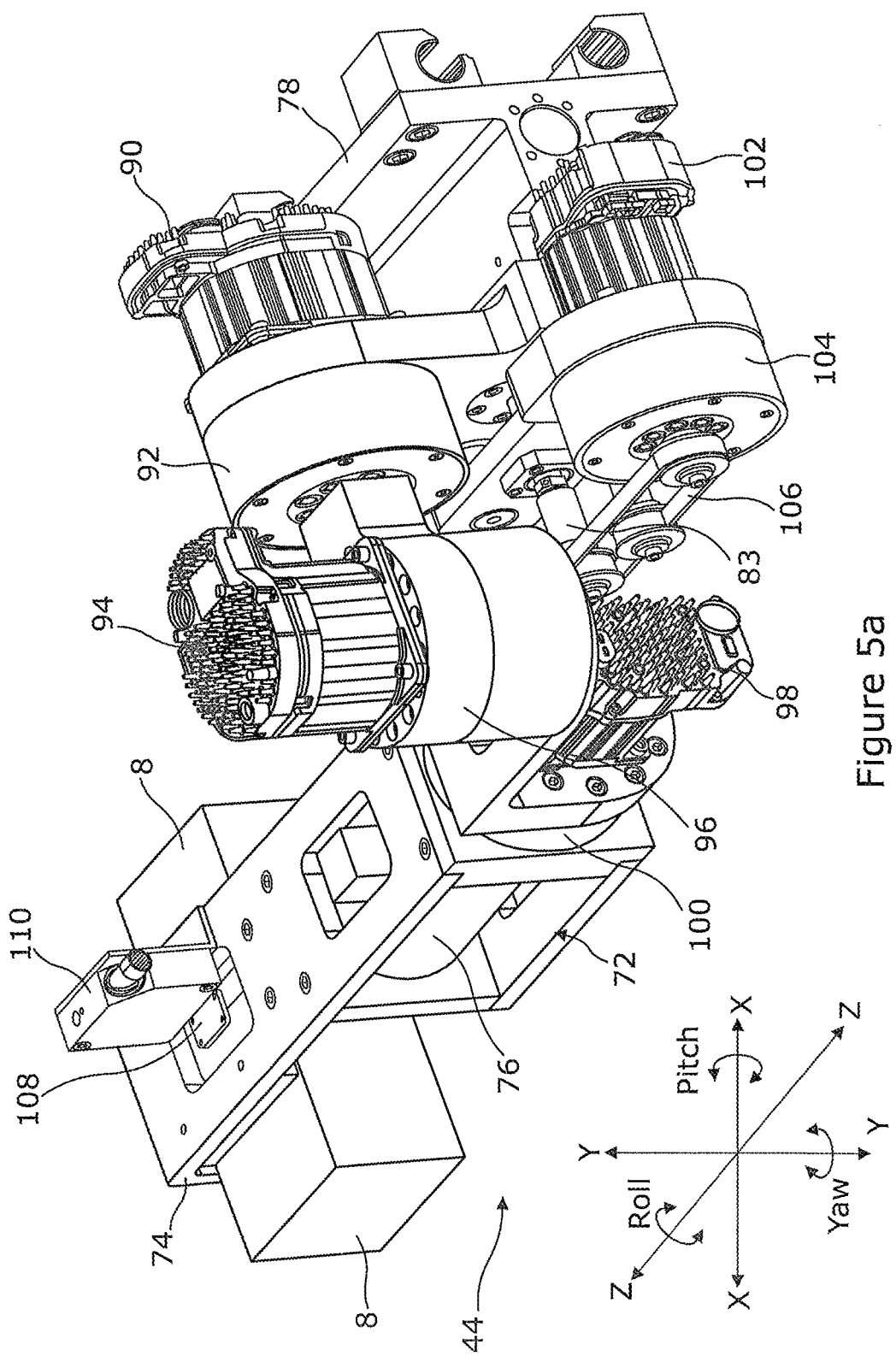
FIGS. 5a and 5b show an enlarged perspective view of brick gripping means provided on the platform means shown in FIGS. 4a and 4b, and a smaller perspective view of the brick gripping means with the movement support arms shown respectively.
Figure 5B:
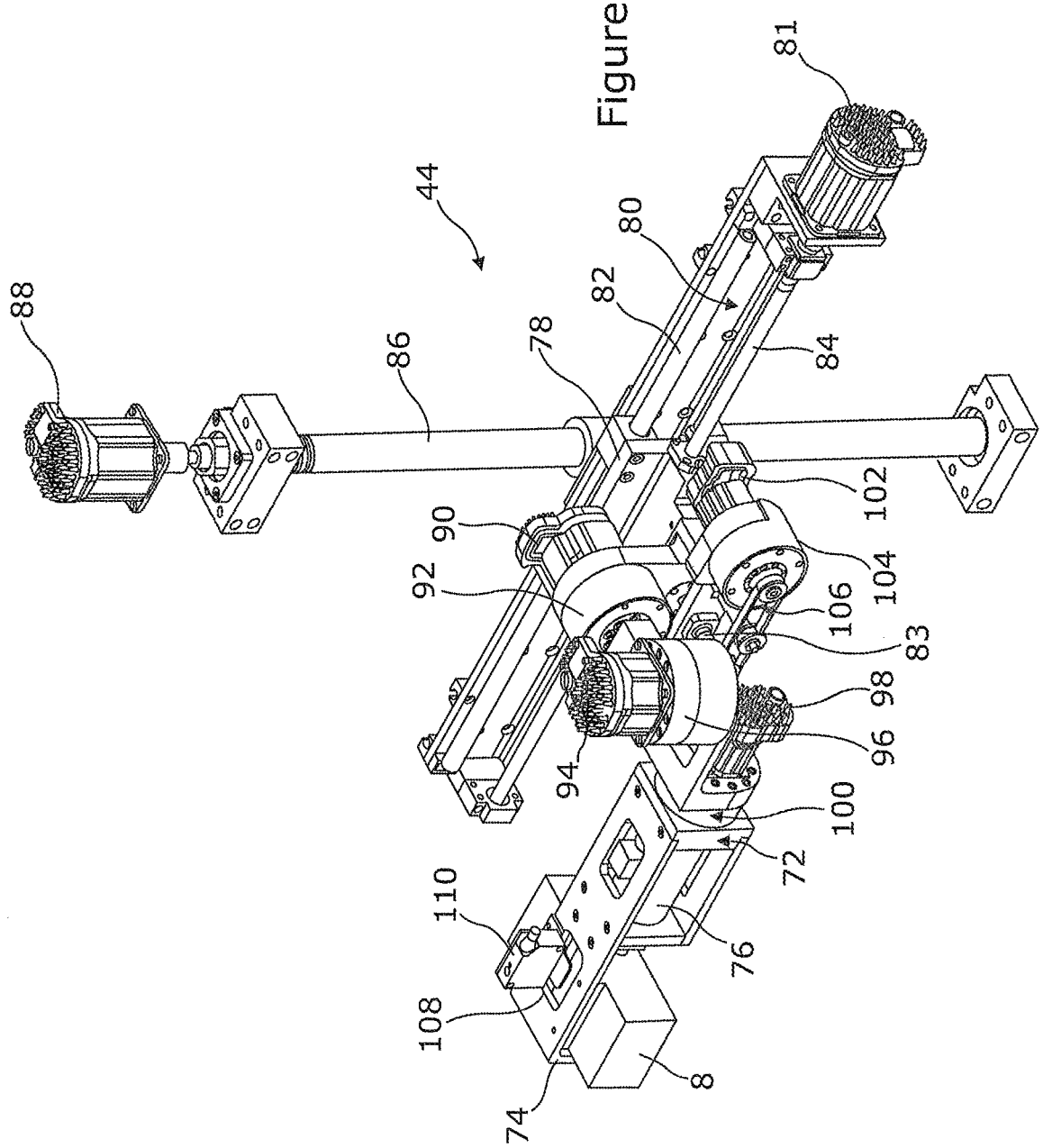

Platform 26 comprises a frame having a top member or plate 46, a base member or plate 48 and four upright frame members 50 provided at each corner of the platform between the plates 46, 48, as shown in FIGS. 4a and 4b. Side panels 52 can be provided between the top and base plates 46, 48 on any of the sides of the frame to act as a safety guard and/or to protect the components located on the platform 26 in use.

The mortar application unit 42 comprises a body portion 54 to which a mortar application nozzle 56 is joined. Mortar is dispensed from the mortar application nozzle 56 in use. A pump 58 is located on top plate 46 of platform 26 for pumping mortar from a mortar containing reservoir 47 to the unit 42 via a conduit (not shown) and through nozzle 56 in use. A motor 59 is associated with pump 58 for driving operation of the same in use.

The body portion 54 of the mortar application unit 42 is slidably mounted on a support arm 61 of the platform in the Z axis direction (i.e. in a direction towards or away from the building 6 being constructed). Support arm 61 is slidably mounted on a support arm 60 of the platform in the X axis direction (i.e. in a horizontal direction to the left or right of the building 6 being constructed). The support arm 60 is in turn slidably mounted on an upright or vertical support arm 64, which is parallel to and joined to an upright frame member 50 of platform 26. Thus, mortar application unit 42 is capable of movement in the X axis, Y axis and Z axis relative to the platform 26 in use. Drive means in the form of a motor 66 is provided for driving the sliding movement of body portion 54 along support arm 61. Drive means in the form of a motor 68 is provided for driving the sliding movement of support arm 61 along support arm 60. Drive means in the form of motor 70 located on top plate 46 is provided for driving the sliding movement of support arm 60 along support arm 64.

The brick gripping unit 44 comprises a body portion 72 having at least one brick gripping jaw 74 movable relative to body portion 72 in use between a brick clamped position, wherein a brick 8 is clamped between the body portion 72 and the jaw 74 and the space between the body portion 72 and jaw 74 is relatively small, and a brick unclamped position, wherein a brick 8 can be inserted between and/or removed from between the body portion 72 and the jaw 74 and the space between the body portion 72 and jaw 74 is relatively large.

A linear actuator 76 is provided in body portion 72 for linear movement of jaw 74 between the clamped and unclamped positions in use.

The brick gripping unit 44 is capable of movement in the X-axis, Y-axis and Z-axis as in the case of the mortar applicator unit 42 but movement of the units 44 and 42 are independent of each other. More particularly, body portion 72 has a Z-axis interface 78 for allowing slidable movement of the body portion 72 along a support unit 80 having upper and lower support arms 82, 84 in the Z-direction. A Z-axis motor 81 is provided on support unit 80 to drive movement of body portion 72 along the Z-axis. The support unit 80 is slidably movable in the Y-axis along vertical support arm 86. Drive means in the form of motor 88 is provided for driving movement of the support unit 80 in the Y-axis along support arm 86. The body portion 72 can also move along a support arm 83 in a X axis.

In addition to allowing movement of the brick gripping unit 44 in the X, Y and Z axes, the unit 44 is arranged to allow movement in three further degrees of movement, namely pitch, roll and yaw. Drive means in the form of motor 90 is provided on unit 44 for driving movement of the unit about a pitch axis. Motor 90 is in turn connected to a harmonic drive mechanism 92. Drive means in the form of motor 94 is provided on unit 44 for driving movement of the unit about a yaw axis. Motor 94 is connected to a harmonic drive mechanism 96. Drive means in the form of a motor 98 is provided on unit 44 for driving movement of the unit about a roll axis. Motor 98 is connected to a harmonic drive mechanism 100. An X-axis motor 102 is provided in connection with a harmonic drive mechanism 104, which in turn is connected to an X-axis drive belt 106 for allowing movement of the body portion 72 along the support arm 83.

Sensing means in the form of a pitch, roll and yaw sensor 108 is provided on body portion 72 for sensing the position of the brick griping unit 44 in the pitch, roll and yaw axes. Sensing means in the form of a brick height measurement sensor 110 is provided on body portion 72 for sensing the height of a brick 8 in use.

Figure 9A:
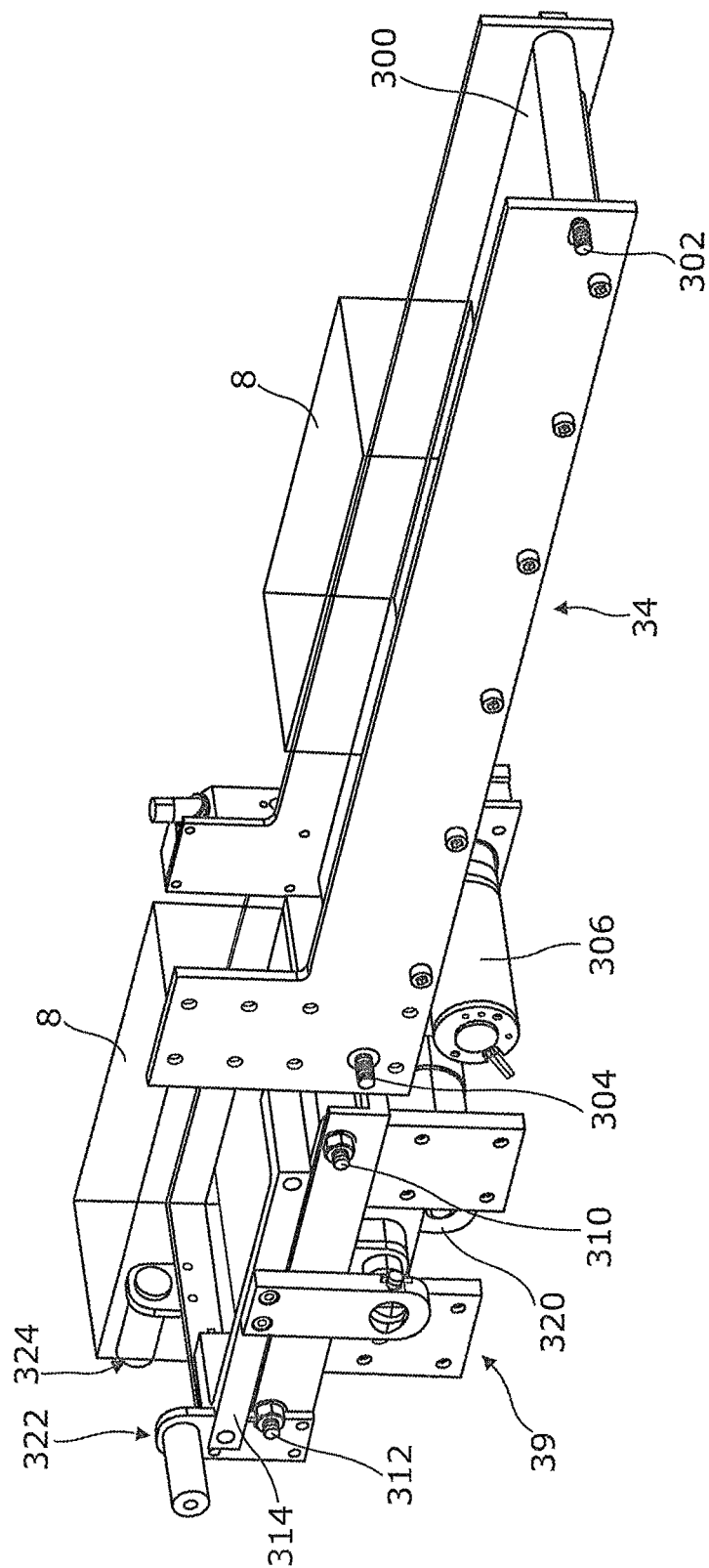
FIGS. 9a and 9b are more detailed perspective views from opposing ends of the brick transfer unit and brick receiving unit that can be used with the platform arrangement shown in FIGS. 4a and 4b.
Figure 9B:
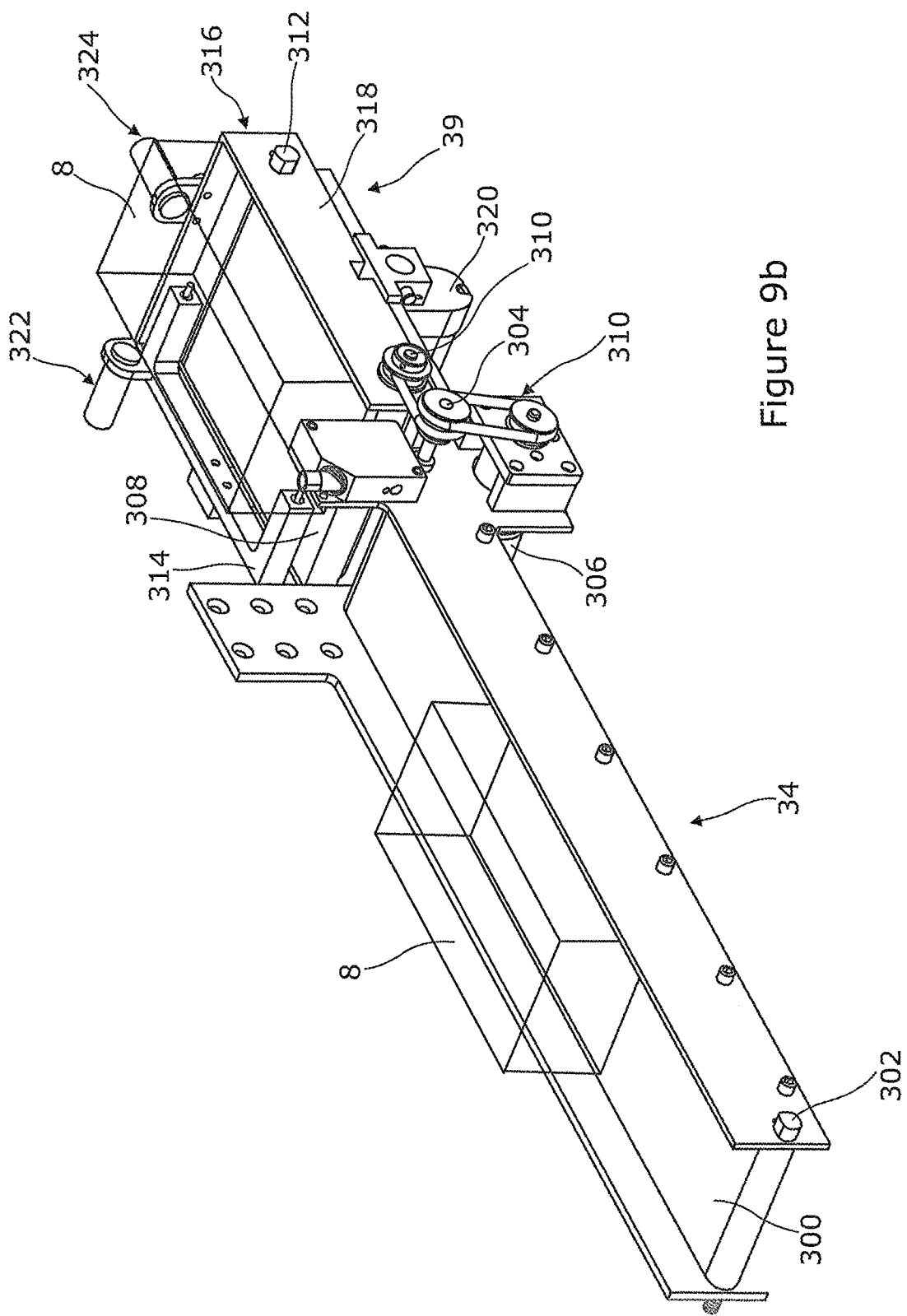

Referring to FIGS. 9a and 9b, there is illustrated the brick transfer unit 34 and the brick receiving unit 39 in greater detail. The brick transfer unit 34 is arranged to move vertically relative to the support structure 16. Unit 34 is provided with conveying means in the form of a conveying belt 300 which allows each brick to be moved in a linear manner along belt 300 towards the brick receiving unit 39 in use. The belt 300 is movable around rollers 302, 304 provided at each opposite ends of the belt. A motor 306 drives movement of the conveying belt 300.

Brick receiving unit 39 also includes conveying means in the form of a conveying belt 308. The belt 308 is movable around rollers 310, 312 provided at opposite ends of the belt. Motor 306 also drives movement of the conveying belt 308 via a pulley mechanism 310. A clamping arm 314 is movable towards and away from belt 308 to allow a brick located on belt 308 to be clamped in place once it reaches the end wall 316 of unit 39, between end wall 316 and side wall 318 (opposite wall to clamping arm 314). A linear actuator 320 is provided to drive the movement of the clamping arm between the brick clamped and brick unclamped positions. With the brick in the clamped position, the brick gripping means is able to know the exact position where it needs to collect the brick from unit 39. Measurement sensors in the form of photoelectric sensors 322, 324 are provided for measuring the width and length respectively of the brick located in the unit 39 in use to allow control means to calculate the movement the brick gripping means will need to undertake to collect brick 8 and where the brick 8 will need to be placed precisely on the construction being built.

It is to be noted that the brick receiving unit 39 can be provided for horizontal or transverse movement of one or more bricks, irrespective of whether a brick storage and/or transfer unit is provided for the movement of one or more bricks in a vertical or upright orientation in use.

Figure 10:
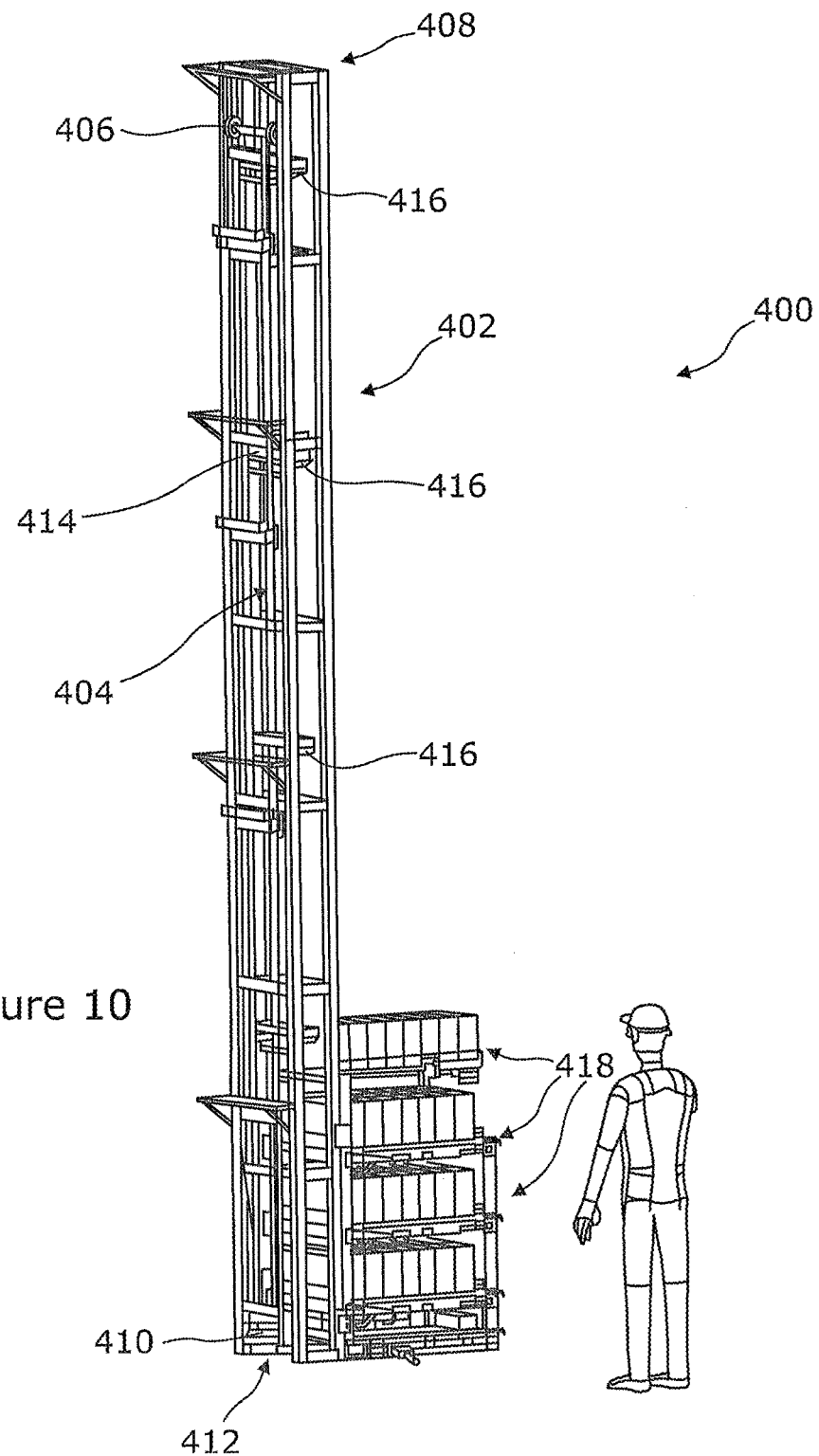
FIG. 10 is a view of a brick storage and/or transfer system according to one embodiment of the present invention that can be used in combination with or separately to the support means shown in FIGS. 3a and 3b.

Referring to FIG. 10, there is shown example of a brick storage and/or transfer system 400 that can be used in combination with or separately to the support structure 16 shown in FIGS. 3a and 3b. The system 400 includes an upright frame 402 having a drive chain 404 located in an upright manner between a shaft and sprocket assembly 406 provided at a top or upper end 408 of the frame 402, and a drive actuator 410 located at a base or lower end 412 of the frame 402.

The drive chain 404 is used to drive movement of a conveyor 414 arranged in an upright or Y-axis between the upper and lower ends 408, 412 of the frame 402 respectively. The conveyor 414 includes a number of trays 416 which can be used to carry single or multiple bricks along the conveyor in use. The trays are typically arranged in a horizontal axis and are perpendicular to the direction of travel of the conveyor 414. The trays are moved to a position on the frame 402 corresponding to a position of brick receiving means or brick transfer means provided on or associated with the platform 26 in use, thereby allowing a brick provided on the tray to be transferred from the tray to the brick receiving means or transfer means as required.

A brick for movement via the system 400 can be transferred from a number of storage shelves or trays 418 located at the base of the system 400. Alternatively, an entire shelf or tray could be moved via the system between the upper and lower ends of the frame 402 as required.

In one embodiment each tray 418 can incorporate one or more horizontal conveyors to transport one or more bricks from an entry loading location of the tray to an exit location. Each tray can accommodate multiple bricks or blocks. In one example, one tray can be dedicated to storing non-standard size bricks or blocks (i.e. half bricks). The vertical conveyor 414 is typically of a comparable height to the height of the support structure 16, thereby allowing bricks to be transported from ground level to the maximum height of the building under construction. The trays 416 being moved along the conveyor 414 can be arranged to be automatically aligned with the exit locations of the storage trays 418. Bricks are automatically transferred between a selected storage tray and the trays 416, and then between the trays 416 to the brick transfer means 34 and/or movable platform. The control of this can be via an automated supervisory control system.

The use of multiple storage trays has three benefits:
i) The storage trays may be loaded from fixed site locations (i.e. the corners of the building under construction). This then enables the automated brick laying system to automatically lay one or more courses of bricks along an extended run without having to replenish the trays. This is particularly beneficial when loading access between adjacent buildings is prohibitive;
ii) It allows automatic mixing of bricks from supplier's single brick packs so as to distribute similar colour shades of kiln fired bricks throughout the building. This is necessary to achieve a more aesthetically pleasing look to the completed construction facade;
iii) It allows different types, sizes and/or coloured bricks to be loaded at pre-selected storage trays at the same time and then distributed and incorporated in the construction process automatically by the system.

The brick storage system 400 can be free standing and/or it can be connected to or integrally formed with the support structure 16.

Figure 11:
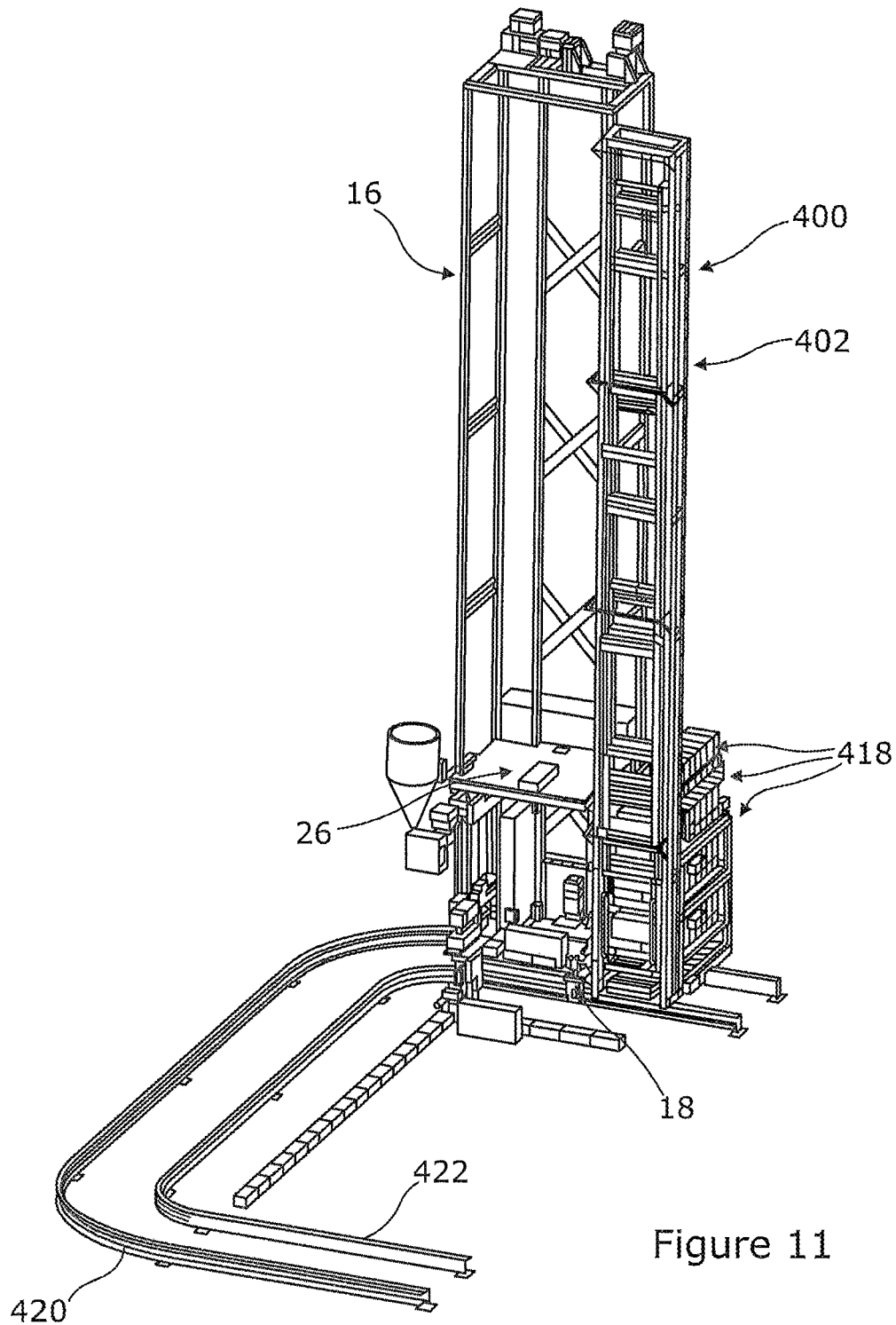
FIG. 11 is a view of support means with a brick storage system located on a rail system according to an embodiment of the present invention.

FIG. 11 shows an example of the brick storage and/or brick transfer system 400 joined to a side of a support structure 16. The support structure 16 is mounted to a pair of rail members 420, 422. The rail members 420, 422 are arranged to allow movement of the bogie or base plate relative thereto in use. An example of one possible platform 26 that is movable relative to support structure 16 is shown.

Figure 12:
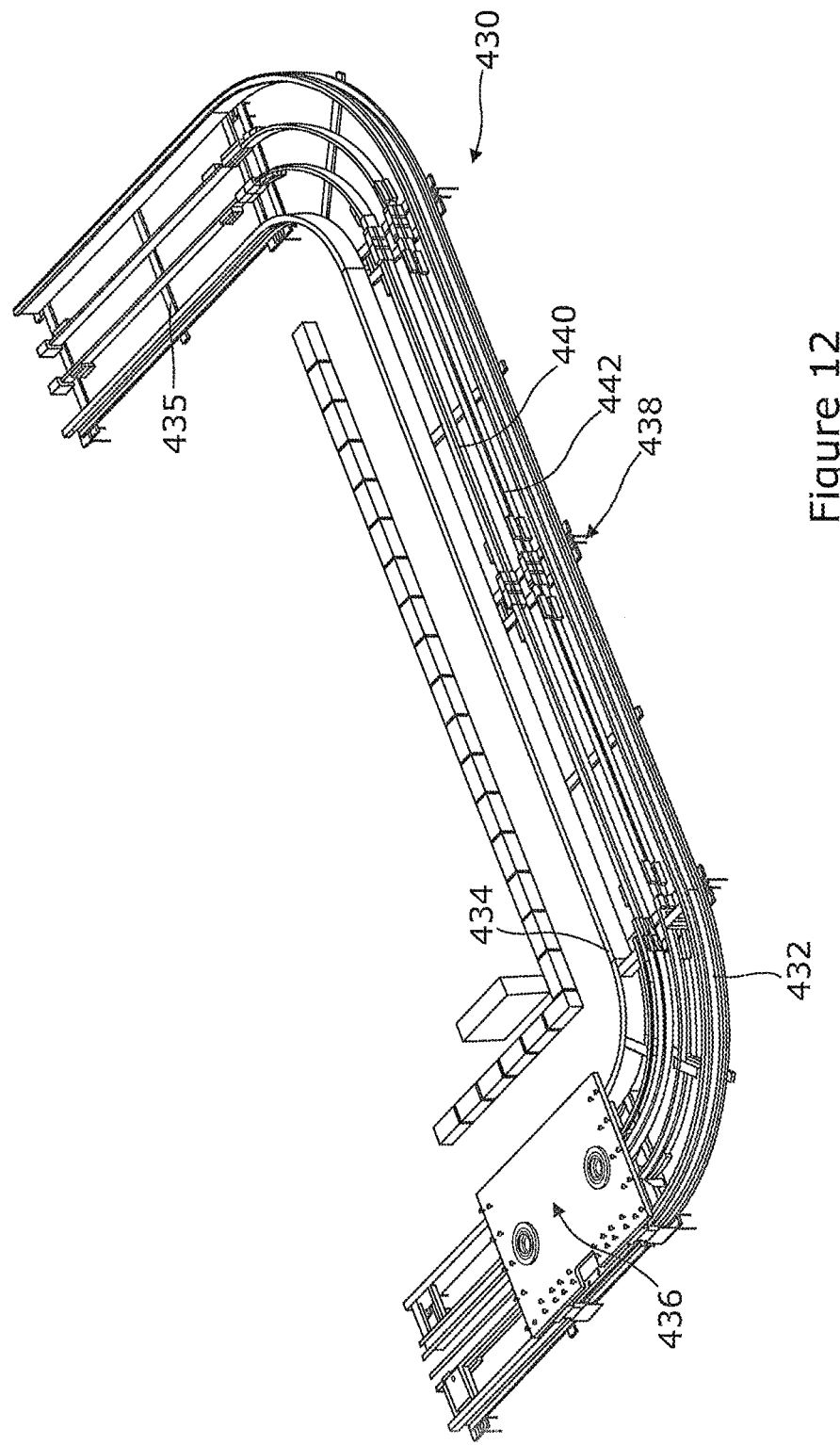
FIG. 12 is a more detailed view of a rail system according to an embodiment of the present invention.
Figure 13A:
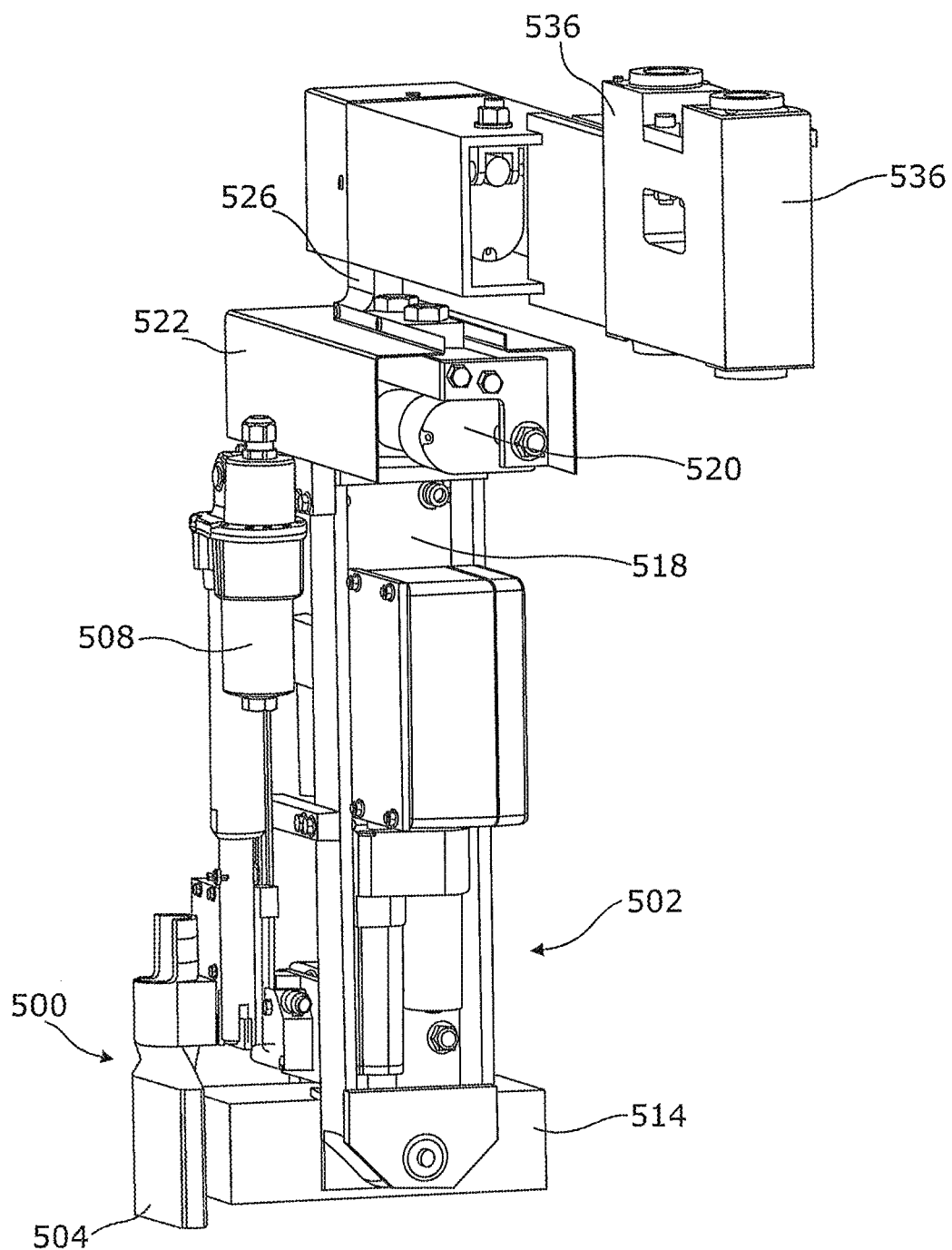
FIGS. 13a and 13b show front and rear perspective views of the mortar application unit and brick gripping unit according to a further embodiment of the present invention.
Figure 13B:
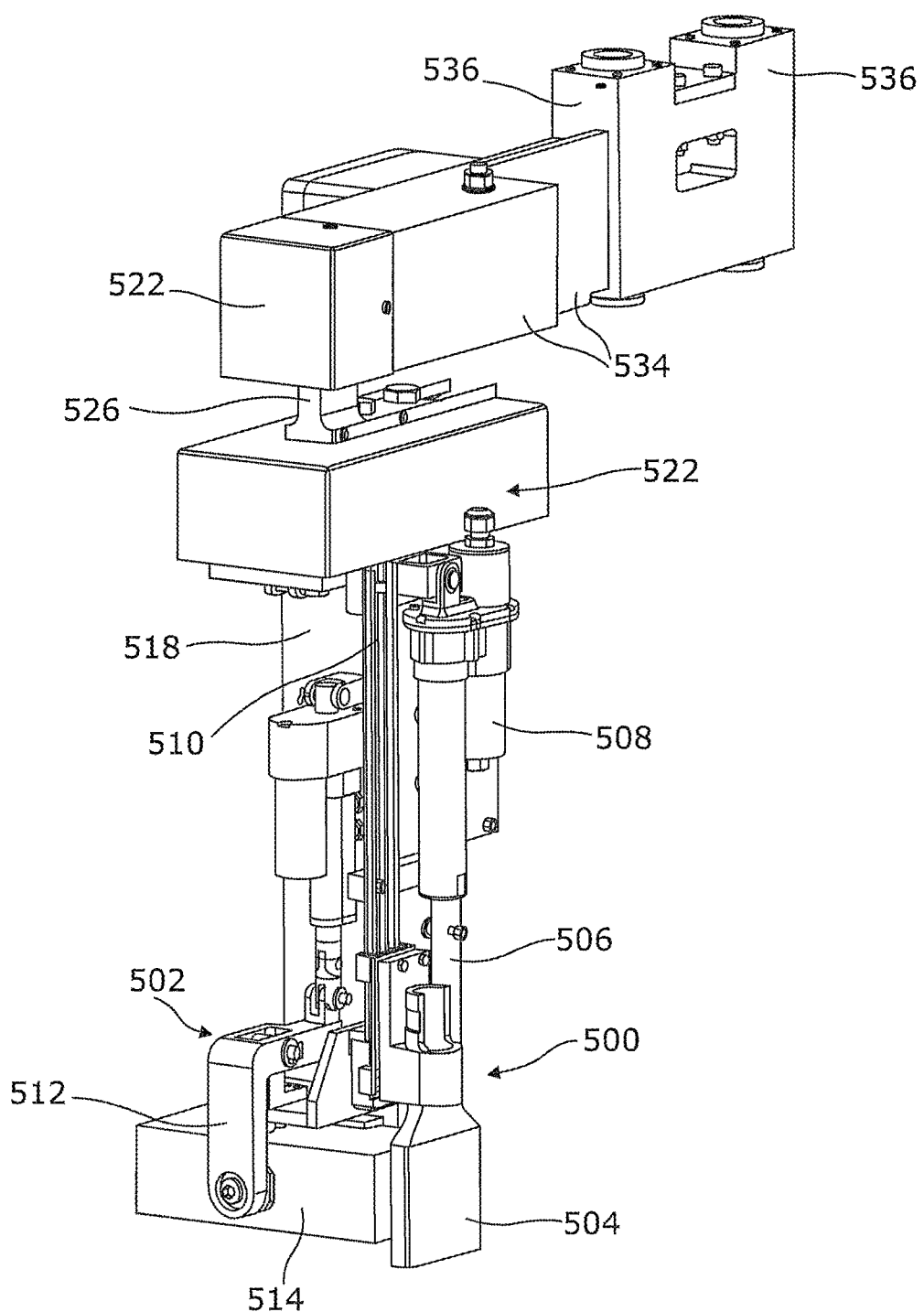
Figure 14A:
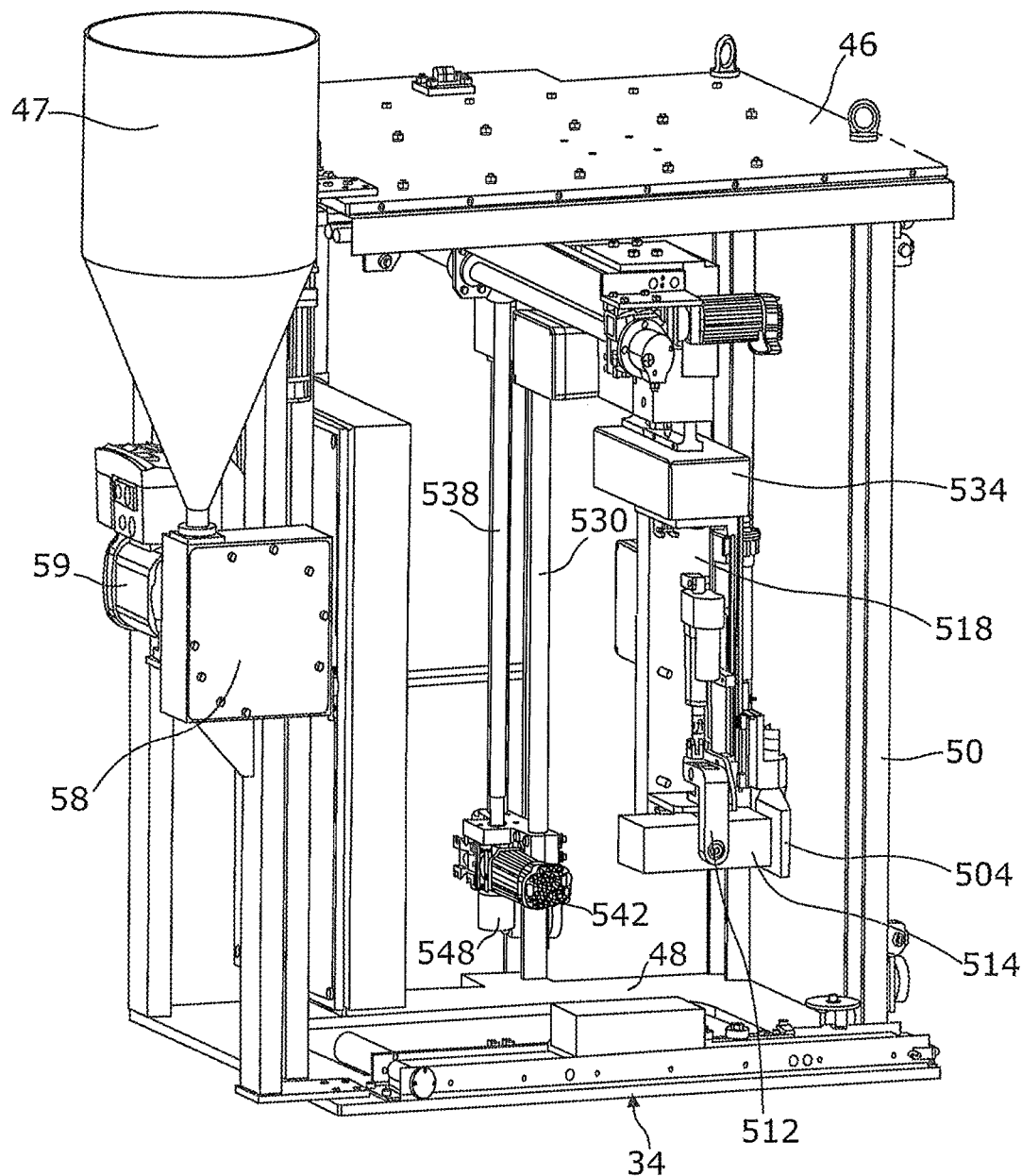
FIGS. 14a and 14b show the mortar application unit and brick gripping unit of FIGS. 13a and 13b in place on a platform in one embodiment.
Figure 14B:
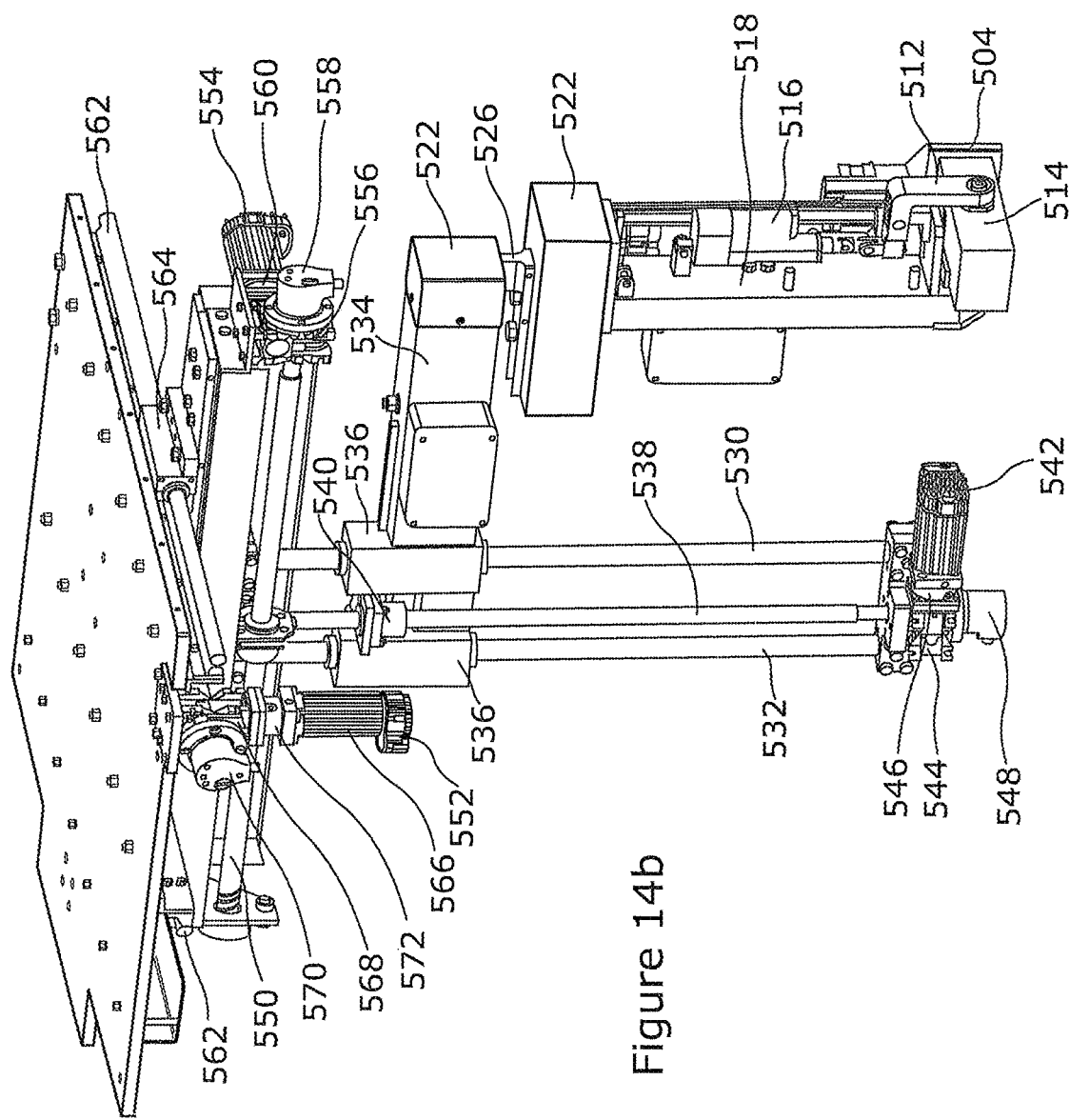

FIG. 12 shows a detailed example of an electrical contact rail system 430 according to an embodiment of the present invention. The rail system includes an outer pair of rail members 432, 434 on which a base plate or bogie 436 of a support structure for the automated brick laying assembly is movably located in use. Support members 435 can be arranged transversally between the rail members 432, 434 to provide support and rigidity to the rail system. The outer pair of rail members 432, 434 typically includes a rack arrangement for interfacing with a pinion system on the bogie 436. The rail members 432, 434 having fixing points 438 along the length of the same to allow fixing to a ground surface in use. An inner pair of electrical conductor members 440, 442 are provided between the outer pair of rail members 432, 434 to allow for the conduction of electrical energy along the same in use. For example, the inner pair of electrical conductor members 440, 442 could comprise an electrical busbar conductor assembly. Electrical connectors or wipers provided on the base of the bogie 436 make contact with the electrical conductive inner rail members 440, 442 to transfer electrical energy to the bogie, and to other equipment that may be located on the bogie in use, such as the mortar application means, the brick gripping means and/or the like.

Referring to FIGS. 13a-14b, there is illustrated an alternative embodiment of the present invention wherein the mortar application unit 500 is joined to the brick gripping unit 502 to form a combined unit. As such, the mortar application unit 500 follows the movement of the brick gripping unit 502 in the X, Y and Z axes. However, the mortar application unit 500 is arranged so as to also be capable of independent movement in a Y-axis (in addition, or as alternative to the Y-axis movement as a result of movement via the brick gripping unit). This arrangement allows a reduced number of drive means or motors to be used compared to the embodiment shown in FIGS. 4a-5b and reduces the complexity and cost of the same.

The mortar application unit 500 has a mortar dispensing nozzle 504 located on the end of a mortar actuator arm 506. The actuator arm 506 is movably mounted to an actuator (or geared motor) 508 to allow movement of the mortar dispensing nozzle in a Y-axis between raised and lowered positions with respect to the brick gripping unit 502. A dispensing nozzle deployment mechanism 510 is provided to act as a guide for movement of the mortar dispensing nozzle 504 in the Y-axis.

The brick gripping unit 502 includes a clamping jaw 512 for clamping a brick 514 in use. A jaw actuator (or geared motor) 516 is provided to allow the clamping jaw to be moved between a clamped position, wherein the jaw 512 can grip a brick in use, and an unclamped position, wherein the jaw can release a brick or be moved into position to collect a brick in use. The jaw actuator 516 is connected to an articulated brick gripper structure 518 including the mortar application unit 500. The articulated brick gripper structure 518 is connected to a yaw actuator (or geared motor) 520 for movement of the gripping unit about a yaw axis. A guard cover 522 is optionally provided to cover the yaw actuator 520. A pitch actuator (or geared motor) 524 is connected to the yaw actuator 520 via a pitch control mechanical linkage 526 for movement of the gripping unit about a pitch axis. A guard cover 522 can be optionally provided to cover the pitch actuator 524.

The combined brick gripper structure and mortar application unit 518 is connected to two spaced apart Y-axis slider arms 530, 532 via a support arm 534 with interfacing sections or bearings 536 to allow sliding of sections 536 along the length of slider arms 530, 532. This allows movement of the combined unit 518 along a Y-axis in use. A Y-axis ball screw arm 538 is provided between the slider arms 530, 532 to allow a ball screw interface 540 to move relative to the same in use. A Y-axis servo motor 542 is provided to drive movement of the interfaces 536, 540 along the arms 530, 532, 538, together with a Y-axis gear box 544, a Y-axis absolute position sensor 548 to detect the position of the support arm 534 along the Y-axis, and a Y-axis brake 546 to stop movement of the interfaces 536, 540 along the arms 530, 532, 538 in use.

The Y-axis slider and ball screw arms 530, 532 and 538 are movably mounted to a Z axis ball screw arm 550 via a ball screw interface 552 to allow sliding movement along a Z-axis in use. A Z-axis servo motor 554 is provided to drive movement of the interface 552 along the arm 550, together with a Z-axis gear box 556, a Z-axis absolute position sensor 558 to detect the position of the interface 552 along the Z-axis, and a Z-axis brake 560 to stop movement of the interface 552 along arm 550 in use.

The Z-axis mechanism 550 is movably mounted to a pair of X-axis slider arms 562 via a slider interface 564 to allow sliding movement along a X-axis in use. A X-axis servo motor 566 is provided to drive movement of the interface 564 along the arms 562, together with a X-axis gear box 568, a X-axis absolute position sensor 570 to detect the position of the interface 564 along the X-axis, and a X-axis brake 572 to stop movement of the interface 465 along arms 265 in use.

In this embodiment the mortar hopper 47, the mortar pump assembly 58 and the motor 59 for driving the mortar pump are provided on a side of the frame 50 of the platform.

It will be appreciated that any or any combination of the components described above from the different embodiments can be used to form an automated brick laying system according to the present invention.

The invention claimed is:

1. An automated brick laying system, said automated brick laying system including:
   platform means;
   mortar application means for allowing mortar to be applied to a brick in use; and
   brick gripping means for allowing at least one brick to be gripped in use;
   characterized in that the mortar application means or the brick gripping means is movably mounted on or to the platform means and is arranged to be independently movable relative to the platform means in use;
   wherein said at least one of the mortar application means and the brick gripping means is arranged to undergo linear and/or sliding movement along at least three separate and pre-defined cartesian axes of movement in use;
   the three pre-defined axes of movement being predefined structural pathways defined on the platform means and each including a X axis support arm, a Y axis support arm and a Z axis support arm;

at least part of the mortar application means and/or brick gripping means movably mounted on one of the X axis, Y axis or Z axis support arms for linear sliding movement therealong and said one axis defined as a first support arm; the first support arm being movably mounted on one other of the X axis, Y axis or Z axis support arms for linear sliding movement therealong and said other axis defined as a second support arm; and the second support arm being movably mounted on a remaining one of the X axis, Y axis or Z axis support arms for sliding linear movement therealong; and the brick gripping means is also arranged to move about pre-defined pitch, roll and yaw axes.

2. The automated brick laying system of claim 1 wherein the mortar application means and the brick gripping means are arranged so as to form a combined unit, wherein one of the mortar application means and the brick gripping means follows movement of the other of the mortar application and the brick gripping means, or has combined movement, in at least two of the pre-defined axes of movement in use.

3. The automated brick laying system of claim 1, wherein both the mortar application means and the brick gripping means are arranged to be independently movable with respect to the platform means and/or to each other in use.

4. The automated brick laying system of claim 1 wherein the mortar application means is arranged so as to be capable of moving about an axis selected from one or more of the group consisting of a pitch axis, a yaw axis, and a roll axis.

5. The automated brick laying system of claim 1 wherein drive means or one or more motors are provided on or associated with the mortar application means and/or brick gripping means for driving movement of the same along each of said pre-defined axes of movement in use.

6. The automated brick laying system of claim 1 wherein the platform means are movably mounted to a support means to allow movement of the platform means with respect to the support means in use.

7. The automated brick laying system of claim 1 wherein the platform means is moved relative to the support means using a hoist system, lifting system or chain driven lifting system.

8. The automated brick laying system of claim 1 wherein a brick transfer unit is provided to allow one or more bricks to be transported from a storage position, ground level, base level or lower level, to an in-use position, raised position, upper level and/or level at which the platform means is located at.

9. The automated brick laying system according to claim 8 wherein a brick receiving unit is provided for receiving one or more bricks from the brick transfer unit and for conveying the one or more bricks to a position for receipt by the brick gripping means.

10. The automated brick laying system according to claim 6 wherein the support means are movably mounted to a rail system to allow movement of the support means relative to a ground or floor surface in use.

11. The automated brick laying system according to claim 10 wherein the rail system incorporates an induction power transfer system, a contactless electrical transfer system or a contact based electrical transfer system to allow electrical power to be supplied via the rail system to the support means and/or platform means in use.

12. The automated brick laying system according to claim 10 wherein the rail system includes a mechanical drive system, a rack and pinion system and/or a chain rack and pinion system to allow movement of the support means relative to the rail system in use.

13. The automated brick laying system according to claim 1 wherein control means are provided on or associated with the system to allow control of one or more parameters of the system, a rail system via which the platform means can be moved, the bricking gripping means, the mortar application means, the platform means, a brick transfer means for allowing one or more bricks to be transferred from a storage or transport position to a brick gripping position.

14. The automated brick laying system according to claim 1 wherein one or more position sensing means are provided on or associated with the mortar application means, the brick gripping means, the platform means, brick transfer or receiving means and/or a rail system used with automated brick laying system to allow the position of one or more components of the system to be calculated and/or monitored in use.

15. The automated brick laying system according to claim 1 wherein the mortar application means is slidably mounted to the Z axis support arm, the Z axis support arm is slidably mounted to the X axis support arm, the X axis support arm is slidably mounted on the Y axis support arm.

16. The automated brick laying system according to claim 1 wherein the brick gripping means is slidably mounted to the Z axis support arm, the Z axis support arm is slidably mounted to the Y axis support arm, the Y axis support arm is slidably mounted on the X axis support arm.

17. The automated brick laying system according to claim 1 wherein the brick gripping means and mortar application means are provided as a combined unit and the combined unit is slidably mounted to the Y axis support arm, the Y axis support arm is slidably mounted to the Z axis support arm, and the Z axis support arm is slidably mounted to the X axis support arm.

18. A method of using an automated brick laying system, said automated brick laying system including platform means, mortar application means for allowing mortar to be applied to a brick in use, and brick gripping means for allowing at least one brick to be gripped in use, said method including the steps of moving at least one of the brick gripping means and/or mortar application means relative to the platform means to allow the brick gripping means to receive and grip at least one brick, applying mortar using the mortar application means to at least one brick laid in a construction position on a construction site, moving at least one of the brick gripping means and/or mortar application means to the construction position to allow the gripped brick to be placed on the mortar in the construction position, releasing said brick from the brick gripping means, characterized in that said mortar application means and the brick gripping means are arranged to undergo linear and/or sliding movement along at least three separate and pre-defined cartesian axes of movement in use; the three pre-defined axes of movement being predefined structural pathways defined on the platform means; and each including a X axis support arm, a Y axis support arm and a Z axis support arm; whereby at least part of the mortar application means and/or brick gripping means are movably mounted on one of the X axis, Y axis or Z axis support arms for linear sliding movement therealong and said one axis defined as a first support arm: the first support arm being movably mounted on one other of the X axis, Y axis or Z axis support arms for linear sliding movement therealong and said other axis defined as a second support arm; and the second support arm being movably mounted on a remaining one of the X axis, Y axis or Z axis support arms for sliding linear movement therealong; and the brick gripping means is also arranged to move about pre-defined pitch, roll and yaw axes.

* * * * *